(12) United States Patent
Bauza et al.

(10) Patent No.: US 9,129,409 B2
(45) Date of Patent: Sep. 8, 2015

(54) SYSTEM AND METHOD OF COMPRESSING VIDEO CONTENT

(75) Inventors: Judit Martinez Bauza, San Diego, CA (US); Srenivas Varadarajan, Tempe, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 1345 days.

(21) Appl. No.: 12/511,349

(22) Filed: Jul. 29, 2009

(65) Prior Publication Data

US 2011/0026582 A1 Feb. 3, 2011

(51) Int. Cl.
| | |
|---|---|
| H04N 7/12 | (2006.01) |
| G06T 3/40 | (2006.01) |
| H04N 1/409 | (2006.01) |
| H04N 1/41 | (2006.01) |
| H04N 19/176 | (2014.01) |
| H04N 19/132 | (2014.01) |
| H04N 19/14 | (2014.01) |
| H04N 19/182 | (2014.01) |
| H04N 19/192 | (2014.01) |
| H04N 19/59 | (2014.01) |

(52) U.S. Cl.
CPC ............ *G06T 3/4007* (2013.01); *H04N 1/4092* (2013.01); *H04N 1/41* (2013.01); *H04N 19/132* (2014.11); *H04N 19/14* (2014.11); *H04N 19/176* (2014.11); *H04N 19/182* (2014.11); *H04N 19/192* (2014.11); *H04N 19/59* (2014.11)

(58) Field of Classification Search
None
See application file for complete search history.

(56) References Cited

U.S. PATENT DOCUMENTS

| | | | |
|---|---|---|---|
| 5,400,076 | A | 3/1995 | Iwamura |
| 5,418,714 | A | 5/1995 | Sarver |
| 5,661,824 | A | 8/1997 | Allebach et al. |
| 6,259,813 | B1 | 7/2001 | Ouchi |
| 6,785,415 | B1 | 8/2004 | Taguchi et al. |
| 6,842,483 | B1 | 1/2005 | Au et al. |

(Continued)

FOREIGN PATENT DOCUMENTS

| | | |
|---|---|---|
| CN | 101316336 A | 12/2008 |
| EP | 1067774 A2 | 1/2001 |

(Continued)

OTHER PUBLICATIONS

Hung K-L et al., "New irregular sampling coding method for transmitting images progressively", IEE Proceedings: Vision, Image and Signal Processing, Institution of Electrical Engineers, GB, vol. 150, No. 1, Feb. 20, 2003, pp. 44-50, XP006019691, ISSN: 1350-245X DOI:10.1049/IP-VIS:20030162.

(Continued)

*Primary Examiner* — Christopher S Kelley
*Assistant Examiner* — Christopher Findley
(74) *Attorney, Agent, or Firm* — Ashish L. Patel

(57) ABSTRACT

A method of interpolating a pixel value is disclosed and may include locating a missing pixel. Further, the method may include determining a plurality of closest pixels, determining a value for each of the plurality of closest pixels, and determining a distance between the missing pixel and each of the plurality of closest pixels. The method may also include classifying each of the plurality of closest pixels as either an edge-pixel or a non-edge pixel and determining a value of the missing pixel at least partially based on the value of each of the plurality of closest pixels, the distance between the missing pixel and each of the plurality of closest pixels, and a classification of each of the plurality of closest pixels.

28 Claims, 20 Drawing Sheets

(56) References Cited

U.S. PATENT DOCUMENTS

| | | | |
|---|---|---|---|
| 7,885,487 B2* | 2/2011 | Ku | 382/300 |
| 2005/0041871 A1* | 2/2005 | Abe | 382/199 |
| 2005/0069217 A1 | 3/2005 | Mukherjee | |
| 2005/0094900 A1* | 5/2005 | Abe | 382/300 |
| 2005/0232515 A1 | 10/2005 | Chae | |
| 2006/0008147 A1 | 1/2006 | Jung et al. | |

FOREIGN PATENT DOCUMENTS

| | | | |
|---|---|---|---|
| EP | 1117072 A1 | 7/2001 | |
| EP | 0797349 | 5/2003 | |
| EP | 2046047 A1 | 4/2009 | |
| FR | 2921504 A1 | 3/2009 | |
| JP | H05153573 A | 6/1993 | |
| JP | H10283471 A | 10/1998 | |
| JP | 2003521163 A | 7/2003 | |
| JP | 2005142858 A | 6/2005 | |
| KR | 0174455 | 3/1999 | |
| KR | 20050111186 A | 11/2005 | |
| KR | 20070119482 A | 12/2007 | |

OTHER PUBLICATIONS

International Search Report and Written Opinion—PCT/US2010/043681, International Search Authority—European Patent Office—Mar. 17, 2011.

Panusopone K et al., "Progressive image transmission by refining sampling lattice", Signals, Systems and Computers, 1996, Conference Record of the Thirtie TH Asilomar Conference on Pacific Grove, CA, USA Nov. 3-6, 1996, Los Alamitos, CA, USA,IEEE Comput Soc, US, Nov. 3, 1996, pp. 1294-1298, XP010231356, ISBN: 978-0-8186-7646-8.

Ramponi G et al., "An adaptive irregular sampling method for progressive transmission", Image Processing, 1998. ICIP 98, Proceedings, 1998 International Conference on Chicago, IL, USA Oct. 4-7, 1998, Los Alamitos, CA, USA.IEEE Comput. Soc, US, vol. 2, Oct. 4, 1998, pp. 747-751, XP010308529, DOI: DOI:10.1109/ICIP.1998.723640 ISBN: 978-0-8186-8821-8.

Sharaf A et al., "Motion compensation using spatial transformations with forward mapping", Signal Processing Image Communication, Elsevier Science Publishers, Amsterdam, NL, vol. 14, No. 3, Jan. 4, 1999, pp. 209-227, XP004144075, ISSN: 0923-5965, DOI: DOI:10.1016/S0923-5965(98)00009-5.

Shezaf N et al., "Adaptive low complexity algorithm for image zooming at fractional sealing ratio", Electrical and Electronic Engineers in Israel, 2000, The 21st IEEE Con vention of the Apr. 11-12, 2000, Piscataway, NJ, USA, IEEE LNKDDOI: 10.1109/EEEI.2000.924383, Apr. 11, 2000, pp. 253-256, XP010543274, ISBN: 978-0-7803-5842-3.

Zhongli He et al., "A High Performance Fast Search Algorithm for Block Matching Motion Estimation", IEEE Transactions on Circuits and Systems for Video Technology, IEEE Service Center, Piscataway, NJ, US, vol. 7, No. 5, Oct. 1, 1997, XP011014418, ISSN: 1051-8215.

European Search Report—EP13004123—Search Authority—The Berlin—Oct. 21, 2013.

European Search Report—EP13004124—Search Authority—Berlin—Aug. 13, 2014.

* cited by examiner

```
P  A  B  C              C  B  A  P
D                             D
E                             E
F                             F
   Top Left                 Top Right F                             F
E                             E
D                             D
P  A  B  C              C  B  A  P
   Bottom Left              Bottom Right
```

FIG. 8

SYSTEM AND METHOD OF COMPRESSING VIDEO CONTENT

RELATED APPLICATIONS

The present application incorporates by reference in its entirety co-pending U.S. patent application Ser. No. 12/511,329, entitled SYSTEM AND METHOD OF COMPRESSING VIDEO CONTENT, filed on evendate herewith.

DESCRIPTION OF THE RELATED ART

When an external display or projector is connected to a mobile device using a wireless link, the data has to be transferred through a wireless channel. If the capacity of the channel is not large enough to handle the data transfer, the source, i.e., raw video, may be compressed. The capacity may not be large enough due to technical constraints of the physical layer of the radio link, e.g., interference that prevents the channel from being used to fully capacity. The capacity may also not be large enough if the channel is shared among other devices. Or, the capacity may not be large enough if a portion of the channel bandwidth is reserved for error mitigation or correction. Current compression methods have various limitations.

Therefore, what is needed is an improved system and method for compressing video content.

BRIEF DESCRIPTION OF THE DRAWINGS

In the figures, like reference numerals refer to like parts throughout the various views unless otherwise indicated.

FIG. 8 is a diagram illustrating text block corners;

SUMMARY OF THE DISCLOSURE

Figure 1:
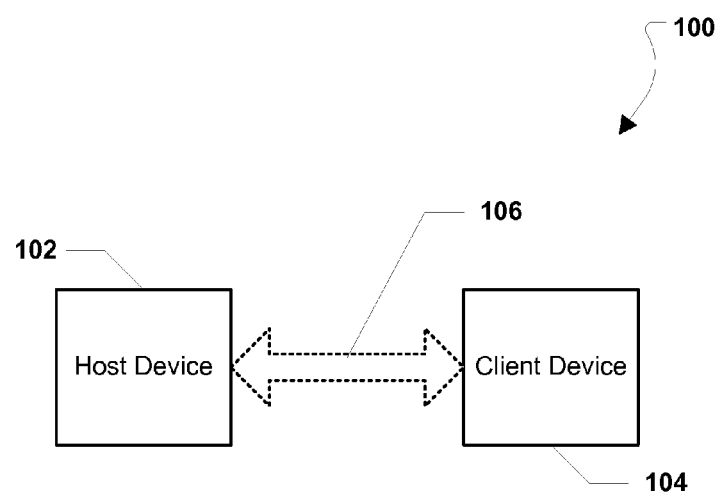
FIG. 1 is a diagram of a wireless system.

A method of interpolating a pixel value is disclosed and may include locating a missing pixel, determining a plurality of closest pixels, determining a value for each of the plurality of closest pixels, determining a distance between the missing pixel and each of the plurality of closest pixels, classifying each of the plurality of closest pixels as either an edge-pixel or a non-edge pixel, and determining a value of the missing pixel at least partially based on the value of each of the plurality of closest pixels, the distance between the missing pixel and each of the plurality of closest pixels, and a classification of each of the plurality of closest pixels.

In a particular aspect, the plurality of closest pixels may include a first pixel along a vertical axis, a second pixel along a vertical axis, a third pixel along a horizontal axis, and a fourth pixel along a horizontal axis. The distance between the missing pixel and each of the plurality of closest pixels may include a first distance along the vertical axis, a second distance along the vertical axis, a third distance along the horizontal axis, and a fourth distance along the horizontal axis. Further, the first pixel along the vertical axis may include a first value, the second pixel along the vertical axis may include a second value, the third pixel along the horizontal axis may include a third value, and the fourth pixel along the horizontal axis may include a fourth value. The first pixel along the vertical axis may include a first classification, the second pixel along the vertical axis may include a second classification, the third pixel along the horizontal axis may include a third classification, and the fourth pixel along the horizontal axis may include a fourth classification.

In this aspect, the method may further include setting a first mask equal to zero or one if the first classification is an edge pixel or a non-edge pixel, setting a second mask equal to zero or one if the second classification is an edge pixel or a non-edge pixel, setting a third mask equal to zero or one if the third classification is an edge pixel or a non-edge pixel, and setting a fourth mask equal to zero or one if the fourth classification is an edge pixel or a non-edge pixel. The method may also include determining a vertical predictor value, wherein the vertical predictor value is determined from Vert_Pred=(LA*A*b+LB*B*a)/(LB*a+LA*b), wherein Vert_Pred is the vertical predictor value, LA is the first mask, A is the first value, b is the second distance, LB is the second mask, B is the second value, and a is the first distance. Moreover, the method may include determining a horizontal predictor value, wherein the horizontal predictor value is determined from Horz_Pred=(LC*C*d+LD*D*c)/(LD*c+LC*d), wherein Horz_Pred is the vertical predictor value, LC is the third mask, C is the third value, d is the fourth distance, LD is the fourth mask, D is the fourth value, and c is the third distance. The method may also include determining an interpolated value for the missing pixel from P=(Vert_Pred+Horz_Pred)/2, wherein Vert_Pred is the vertical predictor value and Horz_Pred is the horizontal predictor value.

Further, in this aspect, the non-edge pixel may be a midpoint pixel. The midpoint pixel may be obtained from a base layer bitstream, an enhancement layer bitstream, or a combination thereof. Moreover, the value of each of the plurality of closest pixels may be selected from the group consisting of: a luminance value, a color density value, a contrast value, or a gradient value.

In another aspect, a decoder device is disclosed and may include means for locating a missing pixel, means for determining a plurality of closest pixels, means for determining a value for each of the plurality of closest pixels, means for determining a distance between the missing pixel and each of the plurality of closest pixels, means for classifying each of the plurality of closest pixels as either an edge-pixel or a non-edge pixel, and means for determining a value of the missing pixel at least partially based on the value of each of the plurality of closest pixels, the distance between the missing pixel and each of the plurality of closest pixels, and a classification of each of the plurality of closest pixels.

In this aspect, the plurality of closest pixels may include a first pixel along a vertical axis, a second pixel along a vertical axis, a third pixel along a horizontal axis, and a fourth pixel along a horizontal axis. The distance between the missing pixel and each of the plurality of closest pixels may include a first distance along the vertical axis, a second distance along the vertical axis, a third distance along the horizontal axis, and a fourth distance along the horizontal axis. Further, the first pixel along the vertical axis may include a first value, the second pixel along the vertical axis may include a second value, the third pixel along the horizontal axis may include a third value, and the fourth pixel along the horizontal axis may include a fourth value. The first pixel along the vertical axis may include a first classification, the second pixel along the vertical axis may include a second classification, the third pixel along the horizontal axis may include a third classification, and the fourth pixel along the horizontal axis may include a fourth classification.

The decoder device may also include means for setting a first mask equal to zero or one if the first classification is an edge pixel or a non-edge pixel, means for setting a second mask equal to zero or one if the second classification is an edge pixel or a non-edge pixel, means for setting a third mask equal to zero or one if the third classification is an edge pixel or a non-edge pixel, and means for setting a fourth mask equal to zero or one if the fourth classification is an edge pixel or a non-edge pixel. Further, the decoder device may include means for determining a vertical predictor value, wherein the vertical predictor value is determined from Vert_Pred= $(LA*A*b+LB*B*a)/(LB*a+LA*b)$, wherein Vert_Pred is the vertical predictor value, LA is the first mask, A is the first value, b is the second distance, LB is the second mask, B is the second value, and a is the first distance. The decoder device may include means for determining a horizontal predictor value, wherein the horizontal predictor value is determined from Horz_Pred=$(LC*C*d+LD*D*c)/(LD*c+LC*d)$, wherein Horz_Pred is the vertical predictor value, LC is the third mask, C is the third value, d is the fourth distance, LD is the fourth mask, D is the fourth value, and c is the third distance. The decoder device may also include means for determining an interpolated value for the missing pixel from P=(Vert_Pred+Horz_Pred)/2, wherein Vert_Pred is the vertical predictor value and Horz_Pred is the horizontal predictor value.

In this aspect, the non-edge pixel may be a midpoint pixel. The midpoint pixel may be obtained from a base layer bitstream, an enhancement layer bitstream, or a combination thereof. Moreover, the value of each of the plurality of closest pixels may be selected from the group consisting of: a luminance value, a color density value, a contrast value, or a gradient value.

In yet another aspect, a device is disclosed and may include a processor. The processor may be operable to locate a missing pixel, to determine a plurality of closest pixels, to determine a value for each of the plurality of closest pixels, to determine a distance between the missing pixel and each of the plurality of closest pixels, to classify each of the plurality of closest pixels as either an edge-pixel or a non-edge pixel, and to determine a value of the missing pixel at least partially based on the value of each of the plurality of closest pixels, the distance between the missing pixel and each of the plurality of closest pixels, and a classification of each of the plurality of closest pixels.

In this aspect, the plurality of closest pixels may include a first pixel along a vertical axis, a second pixel along a vertical axis, a third pixel along a horizontal axis, and a fourth pixel along a horizontal axis. The distance between the missing pixel and each of the plurality of closest pixels may include a first distance along the vertical axis, a second distance along the vertical axis, a third distance along the horizontal axis, and a fourth distance along the horizontal axis. Further, the first pixel along the vertical axis may include a first value, the second pixel along the vertical axis may include a second value, the third pixel along the horizontal axis may include a third value, and the fourth pixel along the horizontal axis may include a fourth value. The first pixel along the vertical axis may include a first classification, the second pixel along the vertical axis may include a second classification, the third pixel along the horizontal axis may include a third classification, and the fourth pixel along the horizontal axis may include a fourth classification.

The processor may be further operable to set a first mask equal to zero or one if the first classification is an edge pixel or a non-edge pixel, to set a second mask equal to zero or one if the second classification is an edge pixel or a non-edge pixel, to set a third mask equal to zero or one if the third classification is an edge pixel or a non-edge pixel, and to set a fourth mask equal to zero or one if the fourth classification is an edge pixel or a non-edge pixel. The processor may be operable to determine a vertical predictor value, wherein the vertical predictor value is determined from Vert_Pred= $(LA*A*b+LB*B*a)/(LB*a+LA*b)$, wherein Vert_Pred is the vertical predictor value, LA is the first mask, A is the first value, b is the second distance, LB is the second mask, B is the second value, and a is the first distance. The processor may be operable to determine a horizontal predictor value, wherein the horizontal predictor value is determined from Horz_Pred=$(LC*C*d+LD*D*c)/(LD*c+LC*d)$, wherein Horz_Pred is the vertical predictor value, LC is the third mask, C is the third value, d is the fourth distance, LD is the fourth mask, D is the fourth value, and c is the third distance. Moreover, the processor may be operable to determine an interpolated value for the missing pixel from P=(Vert_Pred+Horz_Pred)/2, wherein Vert_Pred is the vertical predictor value and Horz_Pred is the horizontal predictor value.

In this aspect, the non-edge pixel may be a midpoint pixel. The midpoint pixel may be obtained from a base layer bitstream, an enhancement layer bitstream, or a combination thereof. Moreover, the value of each of the plurality of closest pixels may be selected from the group consisting of: a luminance value, a color density value, a contrast value, or a gradient value.

In another aspect, a computer program product is disclosed and may include a computer-readable medium. The computer-readable medium may include at least one instruction for locating a missing pixel, at least one instruction for determining a plurality of closest pixels, at least one instruction for determining a value for each of the plurality of closest pixels, at least one instruction for determining a distance between the missing pixel and each of the plurality of closest pixels, at least one instruction for classifying each of the plurality of closest pixels as either an edge-pixel or a non-edge pixel, and at least one instruction for determining a value of the missing pixel at least partially based on the value of each of the plurality of closest pixels, the distance between the missing pixel and each of the plurality of closest pixels, and a classification of each of the plurality of closest pixels.

In this aspect, the plurality of closest pixels may include a first pixel along a vertical axis, a second pixel along a vertical axis, a third pixel along a horizontal axis, and a fourth pixel along a horizontal axis. The distance between the missing pixel and each of the plurality of closest pixels may include a first distance along the vertical axis, a second distance along the vertical axis, a third distance along the horizontal axis, and a fourth distance along the horizontal axis. Further, the first pixel along the vertical axis may include a first value, the second pixel along the vertical axis may include a second value, the third pixel along the horizontal axis may include a third value, and the fourth pixel along the horizontal axis may include a fourth value. The first pixel along the vertical axis may include a first classification, the second pixel along the vertical axis may include a second classification, the third pixel along the horizontal axis may include a third classification, and the fourth pixel along the horizontal axis may include a fourth classification.

The computer-readable medium may include at least one instruction for setting a first mask equal to zero or one if the first classification is an edge pixel or a non-edge pixel, at least one instruction for setting a second mask equal to zero or one if the second classification is an edge pixel or a non-edge pixel, at least one instruction for setting a third mask equal to zero or one if the third classification is an edge pixel or a non-edge pixel, and at least one instruction for setting a fourth mask equal to zero or one if the fourth classification is an edge pixel or a non-edge pixel. Moreover, the computer-readable medium may include at least one instruction for determining a vertical predictor value, wherein the vertical predictor value is determined from Vert_Pred=(LA*A*b+LB*B*a)/(LB*a+LA*b), wherein Vert_Pred is the vertical predictor value, LA is the first mask, A is the first value, b is the second distance, LB is the second mask, B is the second value, and a is the first distance. Also, the computer-readable medium may include at least one instruction for determining a horizontal predictor value, wherein the horizontal predictor value is determined from Horz_Pred=(LC*C*d+LD*D*c)/(LD*c+LC*d), wherein Horz_Pred is the vertical predictor value, LC is the third mask, C is the third value, d is the fourth distance, LD is the fourth mask, D is the fourth value, and c is the third distance. Further, the computer-readable medium may include at least one instruction for determining an interpolated value for the missing pixel from P=(Vert_Pred+Horz_Pred)/2, wherein Vert_Pred is the vertical predictor value and Horz_Pred is the horizontal predictor value.

In this aspect, the non-edge pixel may be a midpoint pixel. The midpoint pixel may be obtained from a base layer bitstream, an enhancement layer bitstream, or a combination thereof. Moreover, the value of each of the plurality of closest pixels may be selected from the group consisting of: a luminance value, a color density value, a contrast value, or a gradient value.

In still another aspect, a method of selectively refining image corners is disclosed and may include scanning a region of an image, classifying the region as either text-containing or non-text-containing, identifying any missing corners within a text-containing region, and adding the missing corners to an edge map. Further, the method may include obtaining an overlapping block of pixels within the image and plotting a histogram (HistN) of the pixels in the block, wherein the histogram comprises a plurality of bins and each bin corresponds to one pixel intensity. The method may also include determining a background pixel ratio (BPR) using BPR=Max(HistN)/Tot_Blk_Pix, wherein Max(HistN) is a maximum number of pixels in the histogram and Tot_Blk_Pix is a total number of pixels in the block of pixels. The method may include determining a number of components (NC) using NC=Sum (HistN>Th1), wherein NC is a number of pixels that exceed a first threshold value, Th1, based on the histogram. Moreover, the method may include determining whether BPR is greater than a second threshold, Th2; determining whether NC is less than a third threshold, Th3, and classifying the block of pixels as a text-containing region if BPR is greater than Th2 and NC is less than Th3.

In this aspect, the method may include performing pattern matching on the text-containing region. Also, the method may include locating a non-edge pixel, considering the non-edge pixel in at least one corner position, locating a plurality of horizontal pixels nearest to the non-edge pixel in the at least one corner position, and locating a plurality of vertical pixels nearest to the non-edge pixel in the at least one corner position. The method may include determining whether any of the plurality of horizontal pixels and the plurality of vertical pixels is an edge pixel and labeling the non-edge pixel as an edge pixel when any of the plurality of horizontal pixels and any of the plurality of vertical pixels is an edge pixel. The at least one corner position may be selected from the group consisting of: top left corner position, a top right corner position, a bottom left corner position, and a bottom right corner position.

In another aspect, a device is disclosed and may include means for scanning a region of an image, means for classifying the region as either text-containing or non-text-containing, means for identifying any missing corners within a text-containing region, and means for adding the missing corners to an edge map. Further, the device may include means for obtaining an overlapping block of pixels within the image and plotting a histogram (HistN) of the pixels in the block, wherein the histogram comprises a plurality of bins and each bin corresponds to one pixel intensity. The device may also include means for determining a background pixel ratio (BPR) using BPR=Max(HistN)/Tot_Blk_Pix, wherein Max(HistN) is a maximum number of pixels in the histogram and Tot_Blk_Pix is a total number of pixels in the block of pixels. The device may include means for determining a number of components (NC) using NC=Sum (HistN>Th1), wherein NC is a number of pixels that exceed a first threshold value, Th1, based on the histogram. Moreover, the device may include means for determining whether BPR is greater than a second threshold, Th2; determining whether NC is less than a third threshold, Th3, and classifying the block of pixels as a text-containing region if BPR is greater than Th2 and NC is less than Th3.

In this aspect, the device may include means for performing pattern matching on the text-containing region. Also, the device may include means for locating a non-edge pixel, means for considering the non-edge pixel in at least one corner position, means for locating a plurality of horizontal pixels nearest to the non-edge pixel in the at least one corner position, and means for locating a plurality of vertical pixels nearest to the non-edge pixel in the at least one corner position. The device may include means for determining whether any of the plurality of horizontal pixels and the plurality of vertical pixels is an edge pixel and means for labeling the non-edge pixel as an edge pixel when any of the plurality of horizontal pixels and any of the plurality of vertical pixels is an edge pixel. The at least one corner position may be selected from the group consisting of: top left corner position, a top right corner position, a bottom left corner position, and a bottom right corner position.

In yet another aspect, a device is disclosed and may include a processor. The processor may be operable to scan a region of an image, to classify the region as either text-containing or non-text-containing, to identify any missing corners within a text-containing region, and to add the missing corners to an edge map. The processor may also be operable to obtain an overlapping block of pixels within the image and to plot a histogram (HistN) of the pixels in the block, wherein the histogram comprises a plurality of bins and each bin corresponds to one pixel intensity. Further, the processor may be operable to determine a background pixel ratio (BPR) using BPR=Max(HistN)/Tot_Blk_Pix, wherein Max(HistN) is a maximum number of pixels in the histogram and Tot_Blk_Pix is a total number of pixels in the block of pixels. The processor may be operable to determine a number of components (NC) using NC=Sum (HistN>Th1), wherein NC is a number of pixels that exceed a first threshold value, Th1, based on the histogram. Also, the processor may be operable to determine whether BPR is greater than a second threshold, Th2, to determine whether NC is less than a third threshold, Th3, and to classify the block of pixels as a text-containing region if BPR is greater than Th2 and NC is less than Th3.

In this aspect, the processor may be operable to perform pattern matching on the text-containing region. The processor may be operable to locate a non-edge pixel, to consider the non-edge pixel in at least one corner position, to locate a plurality of horizontal pixels nearest to the non-edge pixel in the at least one corner position, and to locate a plurality of vertical pixels nearest to the non-edge pixel in the at least one corner position. Also, the processor may be operable to determine whether any of the plurality of horizontal pixels and any of the plurality of vertical pixels is an edge pixel and to label the non-edge pixel as an edge pixel when any of the plurality of horizontal pixels and any of the plurality of vertical pixels is an edge pixel. The at least one corner position is selected from the group consisting of: top left corner position, a top right corner position, a bottom left corner position, and a bottom right corner position.

In yet another aspect, a computer program product is disclosed and may include a computer-readable medium. The computer-readable medium may include at least one instruction scanning a region of an image, at least one instruction classifying the region as either text-containing or non-text-containing, at least one instruction identifying any missing corners within a text-containing region, and at least one instruction adding the missing corners to an edge map. Further, the computer-readable medium may include at least one instruction obtaining an overlapping block of pixels within the image and plotting a histogram (HistN) of the pixels in the block, wherein the histogram comprises a plurality of bins and each bin corresponds to one pixel intensity. The computer-readable medium may also include at least one instruction determining a background pixel ratio (BPR) using BPR=Max(HistN)/Tot_Blk_Pix, wherein Max(HistN) is a maximum number of pixels in the histogram and Tot_Blk_Pix is a total number of pixels in the block of pixels. The computer-readable medium may include at least one instruction determining a number of components (NC) using NC=Sum (HistN>Th1), wherein NC is a number of pixels that exceed a first threshold value, Th1, based on the histogram. Moreover, the computer-readable medium may include at least one instruction determining whether BPR is greater than a second threshold, Th2; determining whether NC is less than a third threshold, Th3, and classifying the block of pixels as a text-containing region if BPR is greater than Th2 and NC is less than Th3.

In this aspect, the computer-readable medium may include at least one instruction performing pattern matching on the text-containing region. Also, the computer-readable medium may include at least one instruction locating a non-edge pixel, at least one instruction considering the non-edge pixel in at least one corner position, at least one instruction locating a plurality of horizontal pixels nearest to the non-edge pixel in the at least one corner position, and at least one instruction locating a plurality of vertical pixels nearest to the non-edge pixel in the at least one corner position. The computer-readable medium may include at least one instruction determining whether any of the plurality of horizontal pixels and the plurality of vertical pixels is an edge pixel and at least one instruction labeling the non-edge pixel as an edge pixel when any of the plurality of horizontal pixels and any of the plurality of vertical pixels is an edge pixel. The at least one corner position may be selected from the group consisting of: top left corner position, a top right corner position, a bottom left corner position, and a bottom right corner position.

In another aspect, a method of inter-edge/inter-midpoint prediction is disclosed and may include receiving previous frame data, initializing a search radius to be equal to one, scanning around a co-located point in the previous frame data using the search radius, and determining whether a reference point is found. The previous frame data and the reference point may include at least one midpoint. Also, the previous frame data and the reference point may include at least one edge.

In this aspect, the method may include setting an inter-predicted value equal to a value of the reference point, when the reference point is found. Further, the method may include increasing the search radius by one, when the reference point is not found and determining whether the search radius is equal to a maximum range. The method may also include scanning around a co-located point in the previous frame data using the search radius, when the search radius is not equal to the maximum range, determining whether a reference point is found, and setting an inter-predicted value equal to a value of the reference point, when the reference point is found. The method may include setting an inter-predicted value equal to a predetermined default value, when the search radius is equal to the maximum range. The predetermined default value may be a middle value in a range of values of frame data.

In another aspect, a device is disclosed and may include means for receiving previous frame data, means for initializing a search radius to be equal to one, means for scanning around a co-located point in the previous frame data using the search radius, and means for determining whether a reference point is found. The previous frame data and the reference point may include at least one midpoint. Also, the previous frame data and the reference point may include at least one edge.

In this aspect, the device may include means for setting an inter-predicted value equal to a value of the reference point, when the reference point is found. Further, the device may include means for increasing the search radius by one, when the reference point is not found and determining whether the search radius is equal to a maximum range. The device may also include means for scanning around a co-located point in the previous frame data using the search radius, when the search radius is not equal to the maximum range, means for determining whether a reference point is found, and means for setting an inter-predicted value equal to a value of the reference point, when the reference point is found. The device may include means for setting an inter-predicted value equal to a predetermined default value, when the search radius is equal to the maximum range. The predetermined default value may be a middle value in a range of values of frame data.

In still another aspect, a device is disclosed and may include a processor. The processor may be operable to receive previous frame data, to initialize a search radius to be equal to one, to scan around a co-located point in the previous frame data using the search radius, and to determine whether a reference point is found. The previous frame data and the reference point may include at least one midpoint. Further, the previous frame data and the reference point may include at least one edge.

In this aspect, the processor may be operable to set an inter-predicted value equal to a value of the reference point, when the reference point is found. The processor may also be operable to increase the search radius by one, when the reference point is not found and to determine whether the search radius is equal to a maximum range. Further, the processor may be operable to scan around a co-located point in the previous frame data using the search radius, when the search radius is not equal to the maximum range, to determine whether a reference point is found, and to set an inter-predicted value equal to a value of the reference point, when the reference point is found. The processor may be operable to set an inter-predicted value equal to a predetermined default value, when the search radius is equal to the maximum range. The predetermined default value may be a middle value in a range of values of frame data.

In another aspect, a computer program product is disclosed and may include a computer-readable medium. The computer-readable medium may include at least one instruction for receiving previous frame data, at least one instruction for initializing a search radius to be equal to one, at least one instruction for scanning around a co-located point in the previous frame data using the search radius, and at least one instruction for determining whether a reference point is found. The previous frame data and the reference point may include at least one midpoint. Also, the previous frame data and the reference point may include at least one edge.

In this aspect, the computer-readable medium may include at least one instruction for setting an inter-predicted value equal to a value of the reference point, when the reference point is found. Further, the computer-readable medium may include at least one instruction for increasing the search radius by one, when the reference point is not found and determining whether the search radius is equal to a maximum range. The computer-readable medium may also include at least one instruction for scanning around a co-located point in the previous frame data using the search radius, when the search radius is not equal to the maximum range, at least one instruction for determining whether a reference point is found, and at least one instruction for setting an inter-predicted value equal to a value of the reference point, when the reference point is found. The computer-readable medium may include at least one instruction for setting an inter-predicted value equal to a predetermined default value, when the search radius is equal to the maximum range. The predetermined default value may be a middle value in a range of values of frame data.

In yet another aspect, a method of intra-edge/intra-midpoint prediction is disclosed and may include determining a plurality of sent pixels, dividing an image into a plurality of pixel blocks having a predetermined size, and determining whether any pixels within each pixel block is within the plurality of sent pixels. The plurality of sent pixels may include a plurality of edge pixels and a plurality of midpoint pixels. The predetermined size may be set equal to a scale factor in a last iteration.

In this aspect, the method may include setting a predictor value equal to a predetermined default value, when none of the pixels within the pixel block is within the plurality of sent pixels. The method may also include setting a predictor value equal to a mean of all sent pixel values within the block of pixels. Further, the method may include determining a residue of unsent pixels. The residue of unsent pixels may include an actual value minus the predictor values.

In another aspect, a device is disclosed and may include means for determining a plurality of sent pixels, means for dividing an image into a plurality of pixel blocks having a predetermined size, and means for determining whether any pixels within each pixel block is within the plurality of sent pixels. The plurality of sent pixels may include a plurality of edge pixels and a plurality of midpoint pixels. The predetermined size may be set equal to a scale factor in a last iteration.

In this aspect, the device may include means for setting a predictor value equal to a predetermined default value, when none of the pixels within the pixel block is within the plurality of sent pixels. The device may also include means for setting a predictor value equal to a mean of all sent pixel values within the block of pixels. Further, the device may include means for determining a residue of unsent pixels. The residue of unsent pixels may include an actual value minus the predictor values.

In yet another aspect, a device is disclosed and may include a processor. The processor may be operable to determine a plurality of sent pixels, to divide an image into a plurality of pixel blocks having a predetermined size, and to determine whether any pixels within each pixel block is within the plurality of sent pixels. The plurality of sent pixels may include a plurality of edge pixels and a plurality of midpoint pixels. The predetermined size may be set equal to a scale factor in a last iteration.

In this aspect, the processor may be operable to set a predictor value equal to a predetermined default value, when none of the pixels within the pixel block is within the plurality of sent pixels. The processor may also be operable to set a predictor value equal to a mean of all sent pixel values within the block of pixels. Further, the processor may be operable to determine a residue of unsent pixels. The residue of unsent pixels may include an actual value minus the predictor values.

In another aspect, a computer program product is disclosed and may include a computer-readable medium. The computer-readable medium may include at least one instruction for determining a plurality of sent pixels, at least one instruction for dividing an image into a plurality of pixel blocks having a predetermined size, and at least one instruction for determining whether any pixels within each pixel block is within the plurality of sent pixels. The plurality of sent pixels may include a plurality of edge pixels and a plurality of midpoint pixels. The predetermined size may be set equal to a scale factor in a last iteration.

In this aspect, the computer-readable medium may include at least one instruction for setting a predictor value equal to a predetermined default value, when none of the pixels within the pixel block is within the plurality of sent pixels. The computer-readable medium may also include at least one instruction for setting a predictor value equal to a mean of all sent pixel values within the block of pixels. Further, the computer-readable medium may include at least one instruction for determining a residue of unsent pixels. The residue of unsent pixels may include an actual value minus the predictor values.

In yet another aspect, a method of refining midpoints is disclosed and may include receiving a plurality of midpoints, scanning a plurality of pixels in a predetermined number of directions using a predetermined step angle from each of the plurality of midpoint pixels, determining whether a current pixel location is greater than a maximum scan distance, and determining whether a current pixel is an edge pixel if the current pixel location is not greater than the maximum scan distance. The method may also include determining whether the current pixel is a midpoint pixel if the current pixel is not an edge pixel and removing the current pixel from a midpoint map when the current pixel is a midpoint pixel. The predetermined number of directions may include eight directions. The predetermined step angle may be forty-five degrees (45°).

In yet another aspect, a device is disclosed and may include means for receiving a plurality of midpoints, means for scanning a plurality of pixels in a predetermined number of directions using a predetermined step angle from each of the plurality of midpoint pixels, means for determining whether a current pixel location is greater than a maximum scan distance, and means for determining whether a current pixel is an edge pixel if the current pixel location is not greater than the maximum scan distance. The device may also include means for determining whether the current pixel is a midpoint pixel if the current pixel is not an edge pixel and removing the current pixel from a midpoint map when the current pixel is a midpoint pixel. The predetermined number of directions may include eight directions. The predetermined step angle may be forty-five degrees (45°).

In still another aspect, a device, the device is disclosed and may include a processor. The processor may be operable to receive a plurality of midpoints, to scan a plurality of pixels in a predetermined number of directions using a predetermined step angle from each of the plurality of midpoint pixels, to determine whether a current pixel location is greater than a maximum scan distance, and to determine whether a current pixel is an edge pixel if the current pixel location is not greater than the maximum scan distance. Further, the processor may be operable to determine whether the current pixel is a midpoint pixel if the current pixel is not an edge pixel and to remove the current pixel from a midpoint map when the current pixel is a midpoint pixel. The predetermined number of directions may include eight directions. The predetermined step angle may be forty-five degrees (45°).

In yet another aspect, a computer program product is disclosed and may include a computer-readable medium. The computer-readable medium may include at least one instruction for receiving a plurality of midpoints, at least one instruction for scanning a plurality of pixels in a predetermined number of directions using a predetermined step angle from each of the plurality of midpoint pixels, at least one instruction for determining whether a current pixel location is greater than a maximum scan distance, and at least one instruction for determining whether a current pixel is an edge pixel if the current pixel location is not greater than the maximum scan distance. The computer-readable medium may also include at least one instruction for determining whether the current pixel is a midpoint pixel if the current pixel is not an edge pixel and removing the current pixel from a midpoint map when the current pixel is a midpoint pixel. The predetermined number of directions may include eight directions. The predetermined step angle may be forty-five degrees (45°).

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, any "content" referred to herein, may also include files that are not executable in nature, such as documents that may need to be opened or other data files that need to be accessed.

In this description, the terms "communication device," "wireless device," "wireless telephone," "wireless communications device," and "wireless handset" are used interchangeably. With the advent of third generation (3G) wireless technology, more bandwidth availability has enabled more electronic devices with wireless capabilities. Therefore, a wireless device could be a cellular telephone, a pager, a PDA, a smartphone, a navigation device, or a computer with a wireless connection.

Referring initially to FIG. 1, a wireless mobile digital display interface (WMDDI) system is shown and is generally designated 100. As shown, the WMDDI system 100 includes a host device 102 and a client device 104. The host device 102 and the client device 104 may be connected via a wireless link 106. In a particular aspect, the host device may be a mobile device such as a cellular phone, a mobile phone, a portable data assistant (PDA), or some other handheld wireless device. Further, the client device 104 may be a wireless display having embedded capabilities such as audio/video decoding, HID, or a combination thereof. For example, the client device 104 may be an external display, a projector, or some other similar device. The wireless link 106 may be a WMDDI.

In a particular aspect, the host device 102 and the client device 104 may be able to establish association and secure communication for the exchange of multimedia content and control messages using the WMDDI protocol. In one aspect, the communication may be asymmetric in the sense that a larger amount of data may be exchanged in the forward link, i.e., from the host device 102 to the client device 104.

In a particular aspect, the host device 102 may include several applications that may provide multimedia content. For example, the host device 102 may include a media player that may decode compressed video and audio bitstreams from a file. The host device 102 may also include one or more video games that may process graphic commands to render image content. Further, the host device 102 may include a camera, e.g., a charged coupled device (CCD) camera, a complementary metal oxide semiconductor (CMOS) camera, or some other camera, that may be used to stream captured red/green/blue (RGB) images. Each of these applications, and other applications that generate image content, may provide raw video, e.g., RGB or Cr/Cb/Y, to an internal display on the host device 102 with a resolution and a bit-depth that matches the resolution and bit-depth of the internal display. The internal display may be a liquid crystal display (LCD) or some other display. The bit rates for raw video content, e.g., RGB, at common display resolutions and frame rates are shown below in Table 1.

TABLE 1

RGB Bit Rates for Common Display Resolutions and Frame Rates.

| Video Sequence (24 bpp) | Bit Rate |
|---|---|
| QVGA (320 × 240), 30 fps | 55.3 Mbps |
| VGA (640 × 480), 30 fps | 221.2 Mbps |
| WVGA (864 × 480), 30 fps | 298.6 Mbps |
| HDTV (1080 × 1920), 30 fps | 1.5 Gbps |

When the client device 104 is connected to the host device 102 using the wireless link 106, the data transferred from the host device 102 to the client device 104 may be transferred through a wireless channel. If the capacity of the wireless channel is not large enough, the raw video data may be compressed. The capacity of the wireless channel may not be sufficient due to technical constraints of the physical layer of the wireless channel, due to the wireless channel being shared among other devices, due to some margin of the channel being retained for error mitigation techniques or correction techniques, or a combination thereof.

The wireless link 106 may not provide a fixed capacity. Accordingly, video transmission through the wireless link 106 may be adaptable to varying channel conditions.

Figure 2:
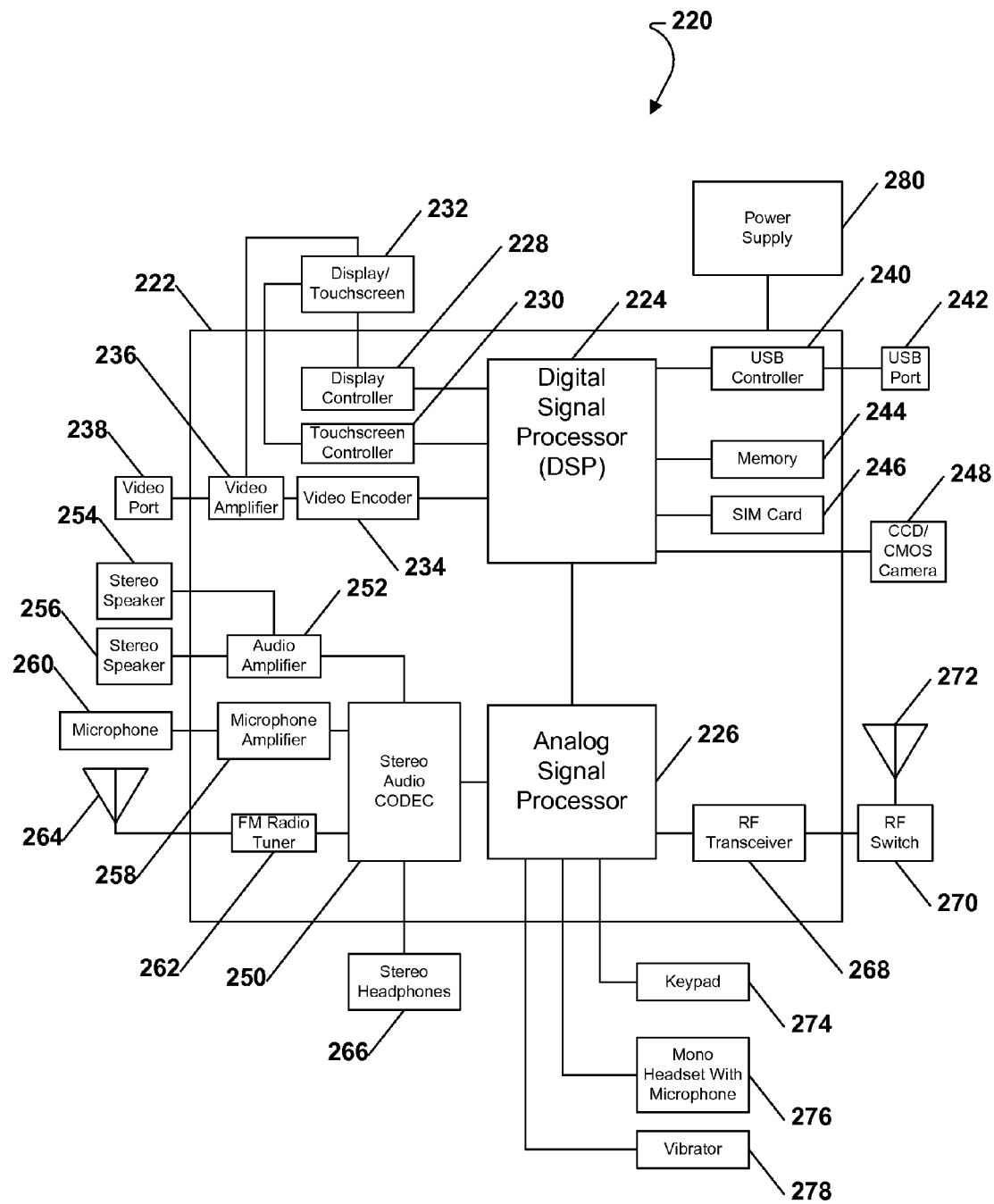
FIG. 2 is a diagram of a telephone.

Referring to FIG. 2, an exemplary, non-limiting aspect of a wireless telephone is shown and is generally designated 220. As shown, the wireless device 220 includes an on-chip system 222 that includes a digital signal processor 224 and an analog signal processor 226 that are coupled together. As illustrated in FIG. 2, a display controller 228 and a touchscreen controller 230 are coupled to the digital signal processor 224. In turn, a touchscreen display 232 external to the on-chip system 222 is coupled to the display controller 228 and the touchscreen controller 230.

FIG. 2 further indicates that a video encoder 234, e.g., a phase alternating line (PAL) encoder, a sequential couleur a memoire (SECAM) encoder, or a national television system(s) committee (NTSC) encoder, is coupled to the digital signal processor 224. Further, a video amplifier 236 is coupled to the video encoder 234 and the touchscreen display 232. Also, a video port 238 is coupled to the video amplifier 236. As depicted in FIG. 2, a universal serial bus (USB) controller 240 is coupled to the digital signal processor 224. Also, a USB port 242 is coupled to the USB controller 240. A memory 244 and a subscriber identity module (SIM) card 246 may also be coupled to the digital signal processor 224. Further, as shown in FIG. 2, a digital camera 248 may be coupled to the digital signal processor 224. In an exemplary aspect, the digital camera 248 is a charge-coupled device (CCD) camera or a complementary metal-oxide semiconductor (CMOS) camera.

As further illustrated in FIG. 2, a stereo audio CODEC 250 may be coupled to the analog signal processor 226. Moreover, an audio amplifier 252 may coupled to the stereo audio CODEC 250. In an exemplary aspect, a first stereo speaker 254 and a second stereo speaker 256 are coupled to the audio amplifier 252. FIG. 2 shows that a microphone amplifier 258 may be also coupled to the stereo audio CODEC 250. Additionally, a microphone 260 may be coupled to the microphone amplifier 258. In a particular aspect, a frequency modulation (FM) radio tuner 262 may be coupled to the stereo audio CODEC 250. Also, an FM antenna 264 is coupled to the FM radio tuner 262. Further, stereo headphones 266 may be coupled to the stereo audio CODEC 250.

FIG. 2 further indicates that a radio frequency (RF) transceiver 268 may be coupled to the analog signal processor 226. An RF switch 270 may be coupled to the RF transceiver 268 and an RF antenna 272. As shown in FIG. 2, a keypad 274 may be coupled to the analog signal processor 226. Also, a mono headset with a microphone 276 may be coupled to the analog signal processor 226. Further, a vibrator device 278 may be coupled to the analog signal processor 226. FIG. 2 also shows that a power supply 280 may be coupled to the on-chip system 222. In a particular aspect, the power supply 280 is a direct current (DC) power supply that provides power to the various components of the wireless device 220 that require power. Further, in a particular aspect, the power supply is a rechargeable DC battery or a DC power supply that is derived from an alternating current (AC) to DC transformer that is connected to an AC power source.

As depicted in FIG. 2, the touchscreen display 232, the video port 238, the USB port 242, the camera 248, the first stereo speaker 254, the second stereo speaker 256, the microphone 260, the FM antenna 264, the stereo headphones 266, the RF switch 270, the RF antenna 272, the keypad 274, the mono headset 276, the vibrator 278, and the power supply 280 are external to the on-chip system 222.

In a particular aspect, one or more of the methods described herein may be stored in the memory 244 as computer program instructions. These instructions may be executed by a processor 224, 226 in order to perform the methods described herein. Further, the processors, 224, 226, the memory 244, the instructions stored therein, or a combination thereof may serve as a means for performing one or more of the methods described herein.

Figure 3:
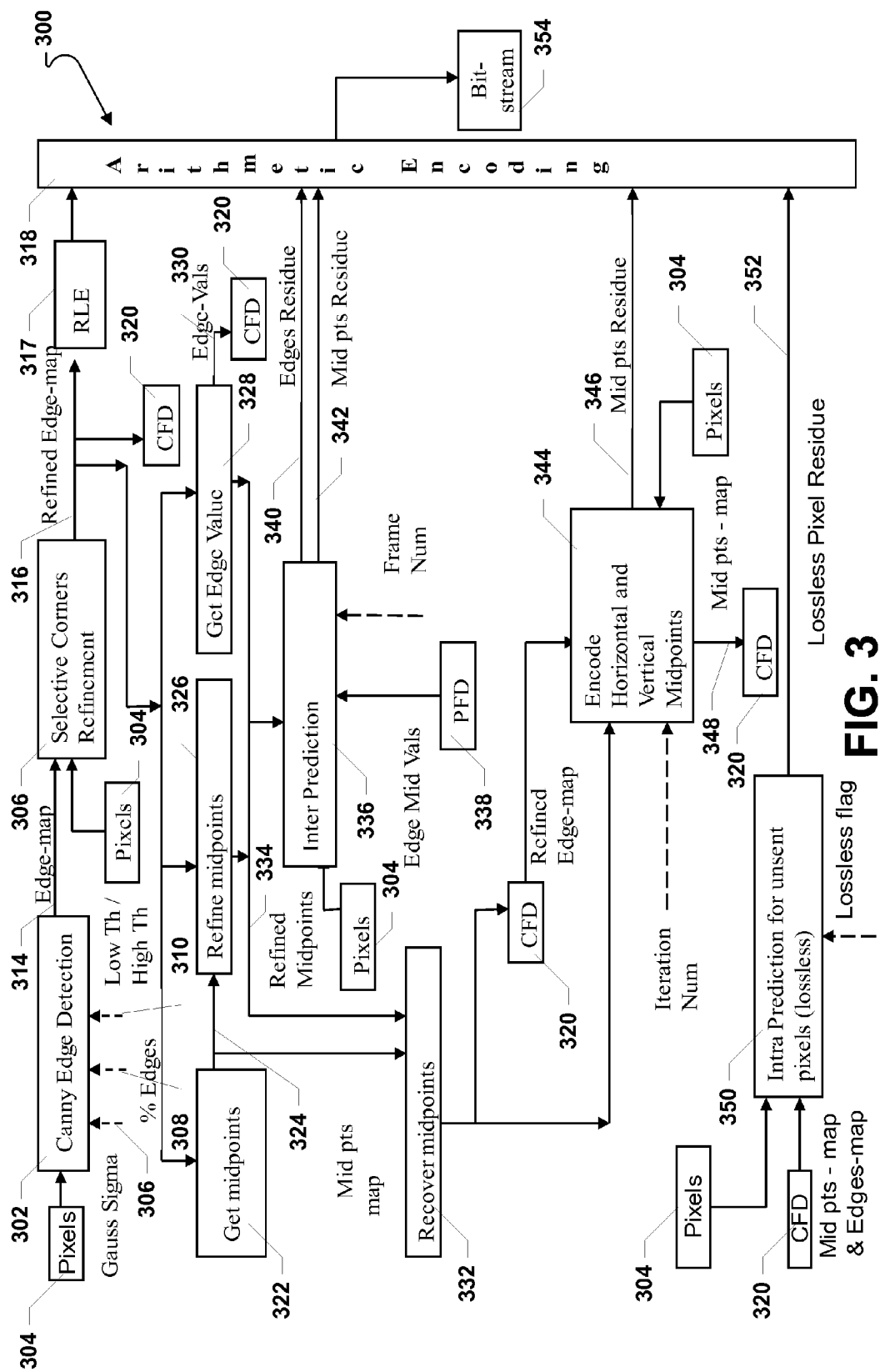
FIG. 3 is a flowchart illustrating a method of compressing graphic content and video content for transmission via a wireless link is shown.

Referring now to FIG. 3, a method of compressing graphic content and video content for transmission via a wireless link is shown and is generally designated 300. Commencing at block 302, edge detection may be performed on a plurality of pixels 304 at least partially based on a Gauss Sigma value 306, a percentage of edges value 308, and a low threshold to high threshold ratio 310. At block 312, selective corner refinement may be performed on the pixels 304 and on an edge-map 314 created at block 302. Moving to block 317, run length encoding may be performed on a refined edge-map 316 created at block 308. Thereafter, at block 318 arithmetic encoding may be performed on the run length encoded data. In a particular aspect, the refined edge-map 316 may be stored in a current frame data (CFD) buffer 320 for use later as described herein.

Proceeding to block 322, the midpoints may be obtained from the refined edge-map 316 to create a midpoints-map 324. Thereafter, the midpoints within the midpoints-map 324 may be refined at block 326 at least partially based on the refined edge-map 316. At block 328, edge values 330 may be obtained from the refined edge-map 316. The edge values may be stored in the CFD buffer 320.

Moving to block 332, midpoints may be recovered based on the refined edge-map 316, the midpoints-map 324, the pixels 304, and a refined midpoints-map 334 created at block 326. At block 336, inter prediction may be performed on the pixels 304 and previous frame data (PFD) received from a PFD buffer 338. The result of the inter prediction method may include edges residue 340 and midpoints residue 342 and arithmetic encoding may be performed on the edges residue 340 and the midpoints residue 342 at block 318. The inter prediction may be performed for multiple frames.

At block 344, horizontal and vertical midpoints may be encoded based on the midpoints-map 324, the refined edge-map 316, the pixels 304, or a combination thereof. The horizontal and vertical midpoint encoding may be performed for multiple iterations. The result of this encoding step may include midpoints residue 346 and arithmetic encoding may be performed on the midpoints reside 346 at block 318. Further, a midpoints map 348 may be output to the CFD buffer 320.

Moving to block 350, intra prediction for unsent pixels may be performed at least partially based on the pixels 304, the current frame data within the CFD buffer 320, the midpoints-map 348, the edges map 314, or a combination thereof. After intra prediction is performed, the encoding may be considered lossless. The results of the intra prediction may include lossless pixel residue on which arithmetic encoding may be performed at block 318. As shown, the output of the method shown in FIG. 3, may be bitstream 354.

Figure 4:
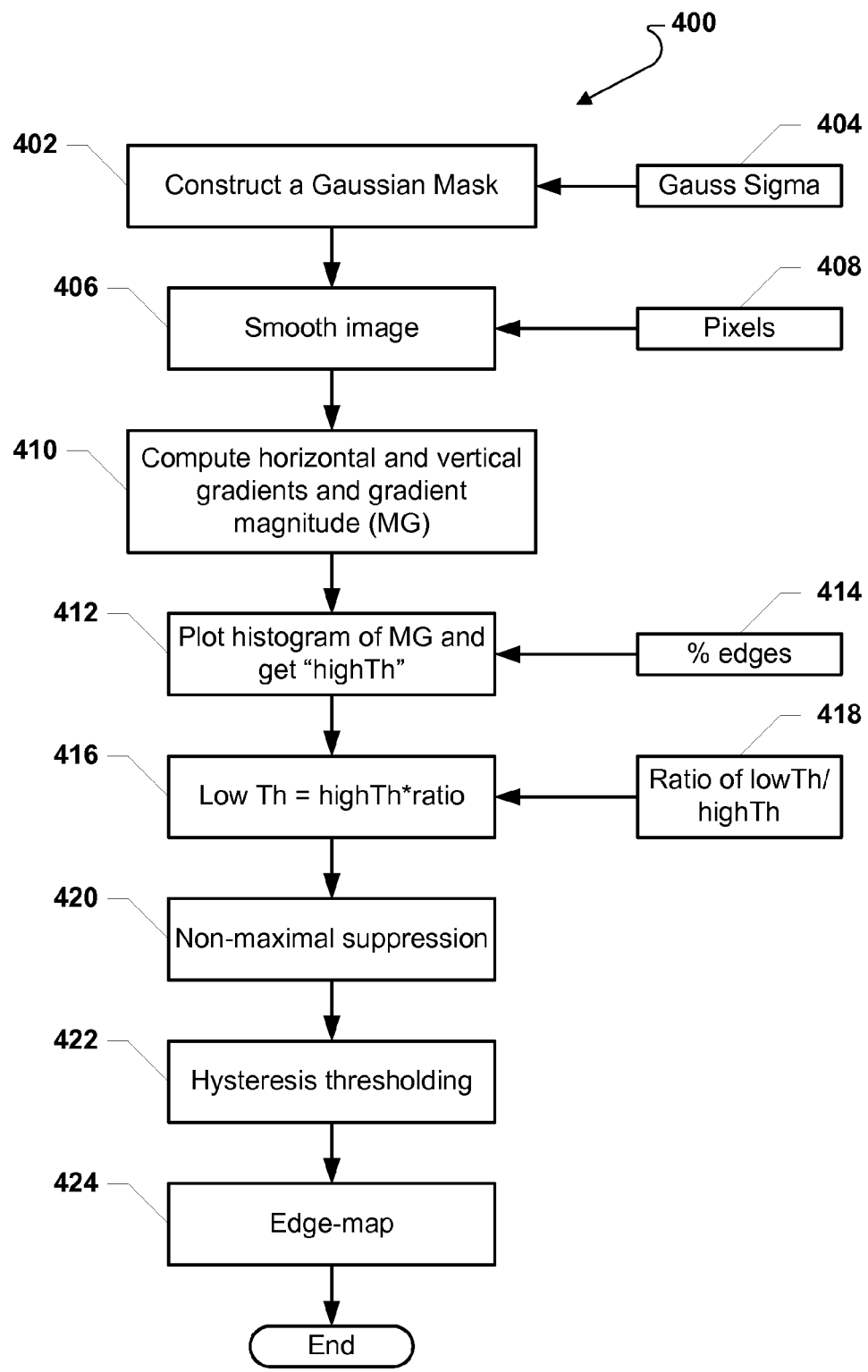
FIG. 4 is a flowchart illustrating a method of detecting image edges.

FIG. 4 illustrates a method of detecting image edges, generally designated 400. Beginning at block 402, an encoder may construct a Gaussian mask using Gauss sigma notation 404. At block 406, the encoder may smooth the image using a plurality of pixels 408. Moving to block 410, the encoder may compute horizontal gradients, vertical gradients, and a gradient magnitude (MG).

At block 412, the encoder may plot a histogram of the MG and obtain a high threshold ("high Th") at least partially based on a percentage of edges 414. Thereafter, at block 416, the encoder may determine a low threshold ("low Th"). The encoder may determine low Th based on a threshold ratio 418 that is equal to low Th/high Tn. At block 420, the encoder may perform non-maximal suppression. At block 422, the encoder may perform hysteresis thresholding. Thereafter, at block 424, the encoder may output an edge-map.

Figure 5:
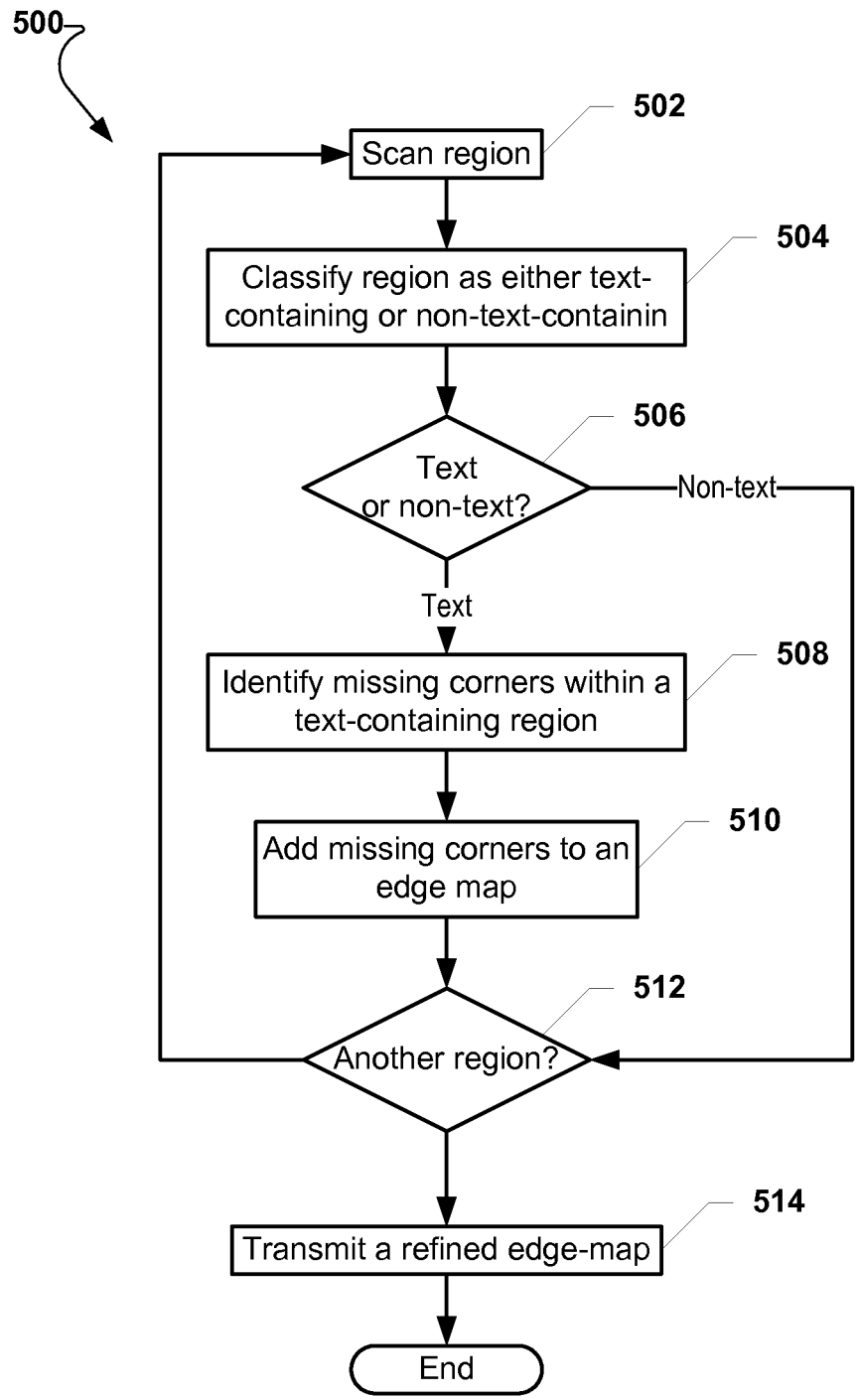
FIG. 5 is a flowchart illustrating a first aspect of a method of selectively refining image corners.

FIG. 5 illustrates a first aspect of a method of selectively refining image corners. Beginning at block 502, a region may be scanned. At block 504, the region may be classified as either text-containing or non-text-containing. At decision 506, it may be determined whether the region is text-containing or non-text-containing. If the region is text-containing, the method 500 may continue to block 508 and the missing corners within the text-containing region may be identified. Then, at block 510, the missing corners may be added to an edge map.

Moving to decision 512, it may be determined if another region is available for scanning. If so, the method 500 may return to block 502 and continue as described herein. Otherwise, the method 500 may move to block 514 and a refined edge-map may be transmitted. The method 500 may then end. Returning to decision 506, if the region is non-text, the method 500 may proceed directly to decision 512 and continue as described herein.

Figure 6:
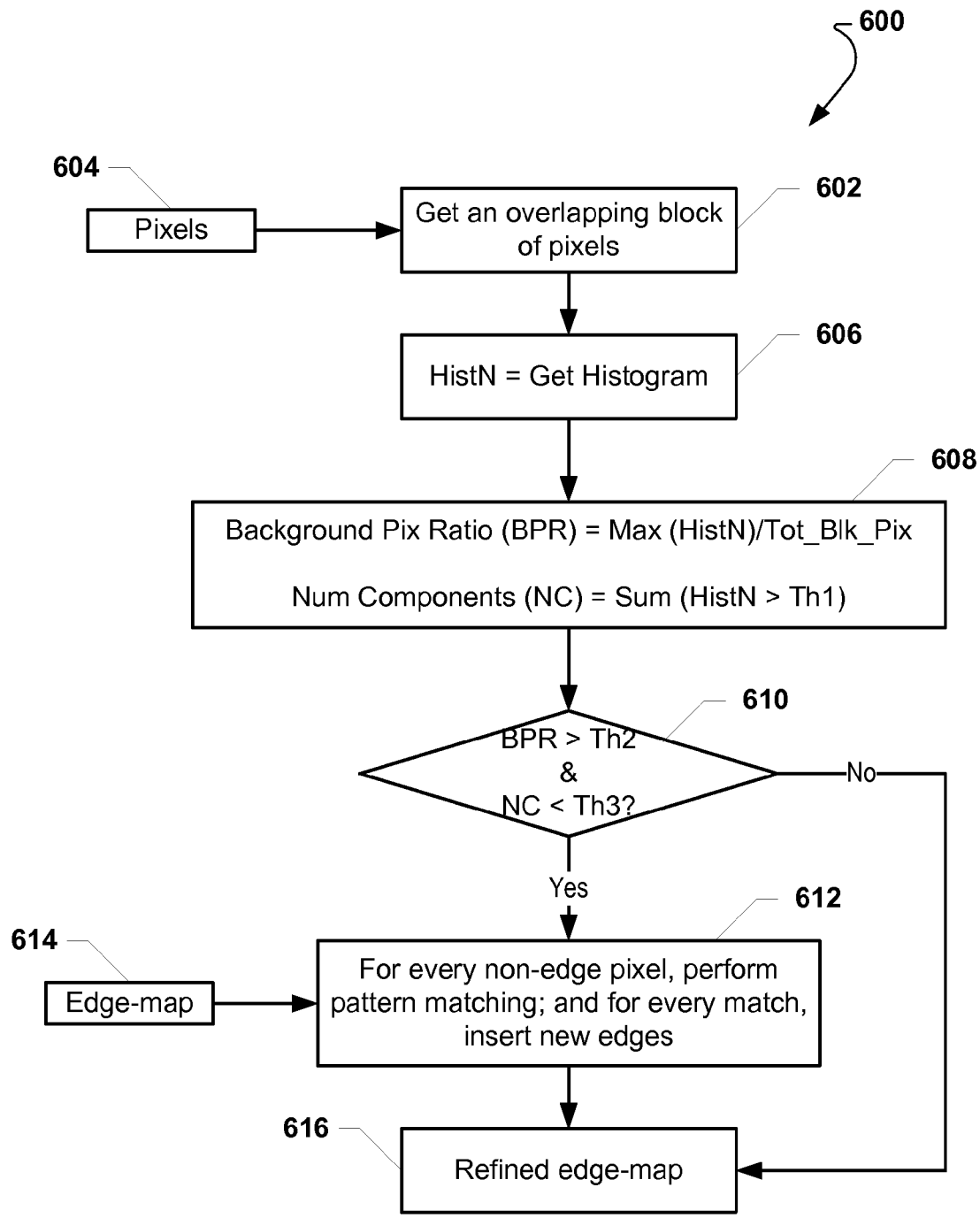
FIG. 6 is a flowchart illustrating a second aspect of a method of selectively refining image corners.

Referring now to FIG. 6, a second aspect of a method of selectively refining image corners is shown and is generally designated 600. Commencing at block 602, the encoder may obtain an overlapping block of pixels 604. Each frame of an image may be divided into square blocks of pixels. The size of each square may have a dimension that is equal to a basic size (Basic_Size) plus two times a pattern matching block size (Pattern_Matching_Block_Size). In other words, the dimension of each square may be determined using the following formula:

$$Side=Basic\_Size+2*Pattern\_Matching\_Block\_Size$$

Further, the bordering Pattern_Matching_Block_Size pixels may overlap with adjacent blocks of pixels.

At block 606, the encoder may obtain a histogram, HistN, of the pixels in the block and plot the histogram so that each bin in the histogram corresponds to one pixel intensity. At block 608, a background pixel ratio (BPR) may be determined using the following formula:

$$BPR=Max(HistN)/Tot\_Blk\_Pix$$

Where:
    Max(HistN)=the maximum number of pixels in the histogram;
    Tot_Blk_Pix=the total number of pixels in the block of pixels.

At block 608, a number of components (NC) may also be determined using the following formula:

$$NC=Sum(HistN>Th1)$$

The number of components may represent a number of pixels whose occurrences exceed a first threshold value, Th1, based on the histogram.

Moving to decision step 610, the encoder may determine whether BPR is greater than a second threshold, Th2, and whether NC is less than a third threshold, Th3. If so, the block of pixels may be classified as a text block and the method 600 may proceed to block 612 and for every non-edge pixel in an edge-map 614, pattern matching may be performed. Also, at block 612, for every match found, new edges may be inserted into the edge-map to create a refined edge-map. At block 616, the encoder may output the refined edge-map. Thereafter, the method 600 may end. Returning to decision 610, if the conditions are not met, the block of pixels may be classified as a non-text block and the method 600 may end. In a particular aspect, the second threshold, Th2, and the third threshold, Th3, may be preset values based on the histogram.

Figure 7:
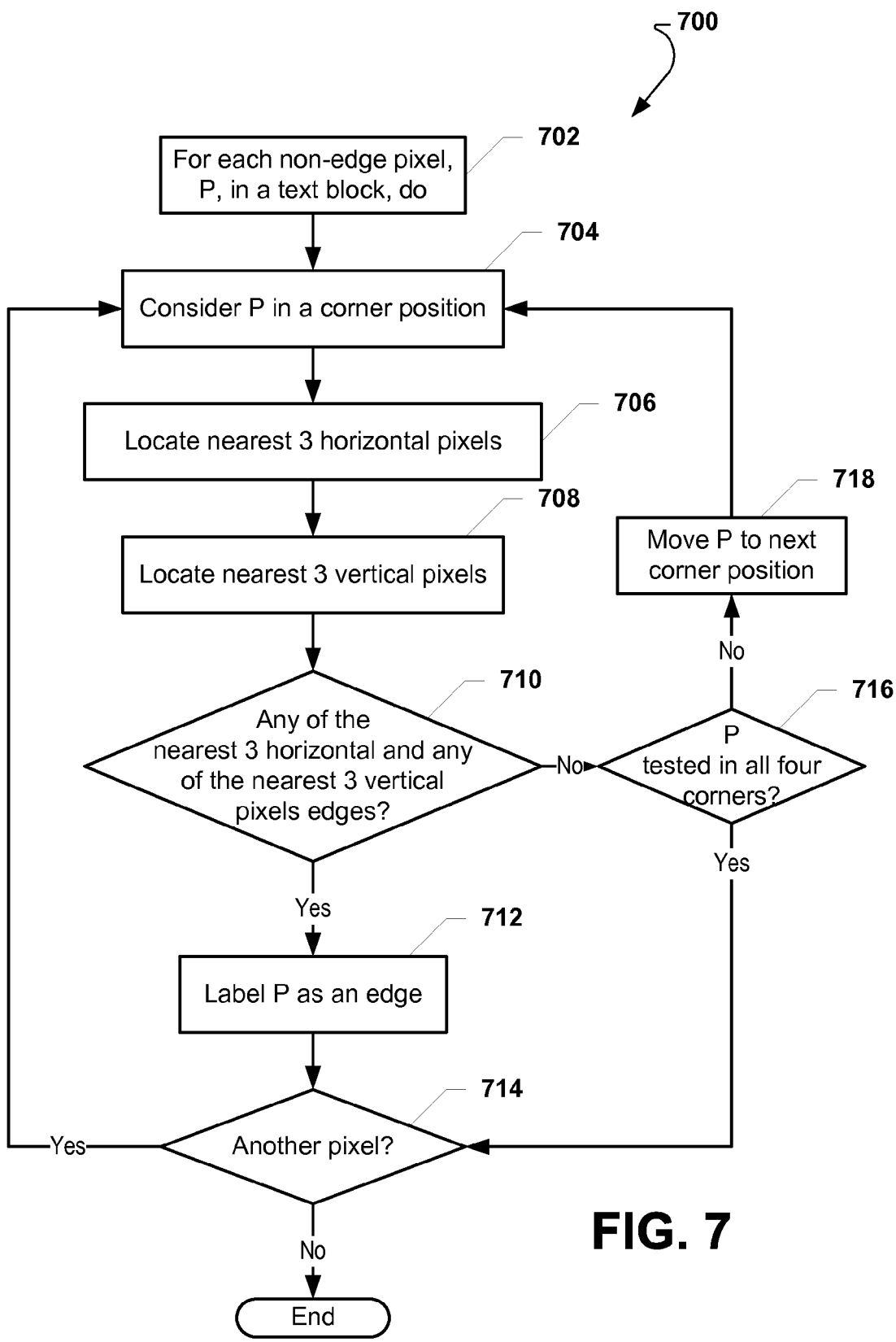
FIG. 7 is a flowchart illustrating a method of pattern matching.

FIG. 7 is a flow chart illustrating a method of pattern matching that is generally designated 700. FIG. 8 is a diagram illustrating text block corners that may be referred to during the description of the method 700 shown in FIG. 7.

Commencing at block 702, for each non-edge pixel, P, in a text block, the following steps may be performed. At block 704, P, may be considered as if it is in a corner position, e.g., a top left corner, a top right corner, a bottom left corner, or a bottom right corner. At block 706, the nearest three (3) horizontal pixels may be located. At block 708, the nearest three (3) vertical pixels may be located. In a particular aspect, three (3) is the selected Pattern_Matching_Block_Size.

Moving to decision 710, the encoder may determine whether any of the nearest three (3) horizontal pixels and any of the nearest three (3) vertical pixels are edges. If so, the method 700 may move to block 712, and the pixel, P, may be labeled as an edge. Thereafter, at decision 714, the encoder may determine if another pixel is available for pattern matching. If so, the method 700 may return to block 704 and continue as described herein. Otherwise, the method 700 may end.

Returning to decision step 710, if none of the nearest six pixels is an edge, the method 700 may move to decision 716 and the encoder may determine whether the pixel, P, is tested in all four corners. If not, the method 700 may proceed to block 718 and the pixel, P, may be moved to a next corner position. If the pixel, P, is tested in all corner locations, the method 700 may continue to decision 714 and continue as described herein.

In a particular aspect, the methods 600, 700 shown in FIG. 6 and FIG. 7, may be used to refine an edge-map by including missing corners in regions that contain text. These methods 600, 700 may locally classify regions as either text-containing or non-text-containing. This may be determined based on the local histogram of luminance. The decisions in method 600 may be based on predefined threshold values in the luminance histogram, i.e., Th1, Th2, and Th3. Further, the methods 600, 700 may select an area in text-containing regions that may contain a missing corner. These areas may be selected using pattern matching over an initial edge-map. For the selected areas, the missing corners may be added to the edge-map.

Many well known edge detects may fail to detect the corners in text portions of an image wherein the image gradient is not strongly oriented in the horizontal or the vertical direction. Many edge-pixels may be undetected and cause the midpoints from one region being used for interpolation in another region and leads to a streaking artifact. The corner refinement method described in conjunction with FIG. 6 and FIG. 7 uses pattern matching to predict locations of undetected edges, e.g., corners, and introduce new edges in an edge-map. Since this may lead to a large number of new edges, and as such, introduce a higher bit-rate for non-text regions, pre-processing steps (steps 602-510) may be included in order to classify a frame into blocks of text or non-text regions. The corner refinement is then selectively applied for text regions of the image.

The methods 600, 700 shown in FIG. 6 and FIG. 7 may improve a pixel signal-to-noise ratio (PSNR) by approximately five to eight decibels (5-8 dB) for a similar bit-rate transmission. Further, these methods 600, 700 are relatively computationally inexpensive as they utilize simple pattern matching that may be optimized using bit-wise operators. A need for elaborate gradient computation methods, e.g., the Harris Corner Detector, may be eliminated.

Figure 9:
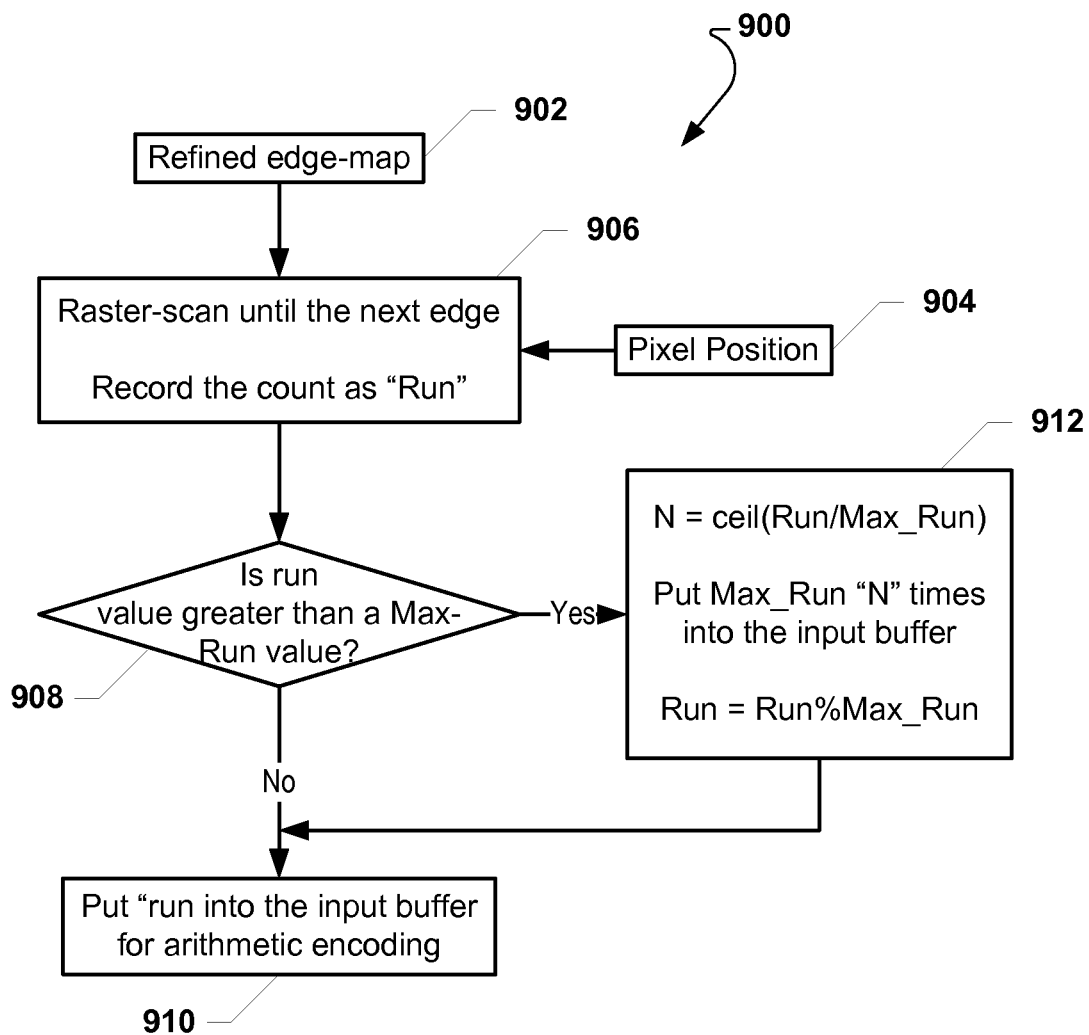
FIG. 9 is a flowchart illustrating a method of run length encoding.

FIG. 9 illustrates a method of run length encoding that is generally designated 900. In a particular aspect, the method 900 may be performed on a refined edge-map 902 that may be input to an encoder. Further, the method 900 may utilize one or more pixel positions 904 in performing the run length encoding.

Commencing at block 906, the encoder may raster-scan the refined edge-map 902 until a next edge is found. The pixel count to the edge may be recorded as "Run". At decision step 908, the encoder may determine whether the Run value is greater than a Max_Run value. If not, the Run value may be put in an input buffer for arithmetic encoding. The method 900 may then end. Returning to decision 908, if the Run value is greater than the Max_Run value, the Max_Run value may be put in the input buffer "N" times, wherein N=ceil (Run/Max_Run) and ceil( ) takes the largest integer such that N<=Run/Max_Run, followed by the value obtained as Run=Run % Max_Run. The method 900 may then end.

Figure 10:
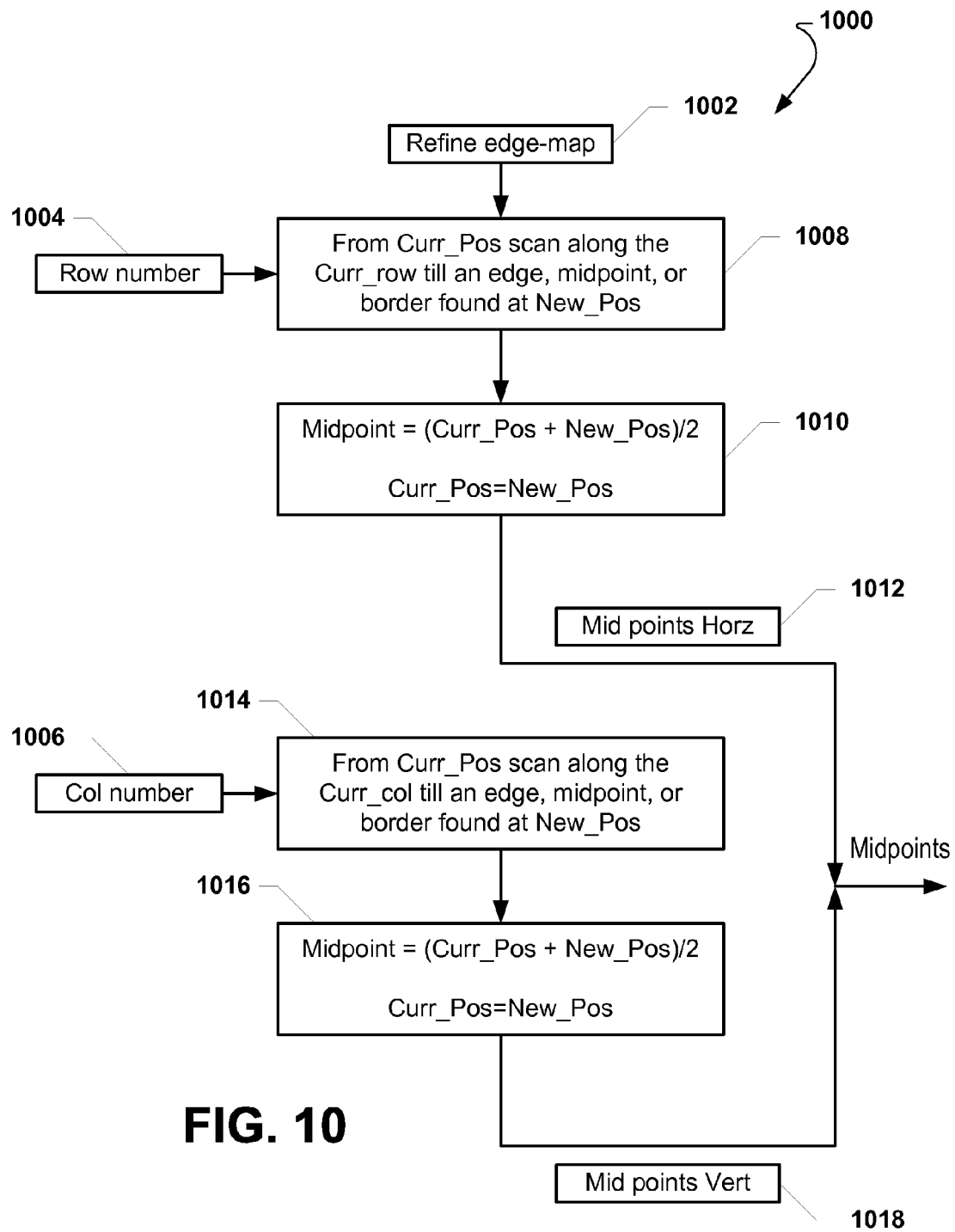
FIG. 10 is a flowchart illustrating a method of obtaining image midpoints.

Referring to FIG. 10, a method of obtaining image midpoints within a frame is shown and is generally designated 1000. The method 1000 of FIG. 10 may be performed by an encoder on a refined edge-map 1002 having a plurality of rows 1004 and a plurality of columns 1006. Further, the method 1000 may be performed on each row 1004 and each column 1006.

Beginning at block 1008, the encoder may scan from a current position, Curr_Pos, along a current row, Curr_Row until an edge, midpoint, or a border is found at a new position, New_Pos. At block 1010, a midpoint is defined as the current position plus the new position divided by two, i.e., Midpoint=(Curr_Pos+New_Pos)/2. Further, at block 1010, the current position is set equal to the new position, i.e., Curr_Pos=New_Pos. At block 1012, a plurality of horizontal midpoints may be output.

At block 1014, the encoder may scan from a current position, Curr_Pos, along a current column, Curr_Col until an edge, midpoint, or a border is found at a new position, New_Pos. At block 1016, a midpoint is defined as the current position plus the new position divided by two, i.e., Midpoint=(Curr_Pos+New_Pos)/2. Further, at block 1016, the current position is set equal to the new position, i.e., Curr_Pos=New_Pos. At block 1018, a plurality of vertical midpoints may be output. The method 1000 may then end.

Figure 11:
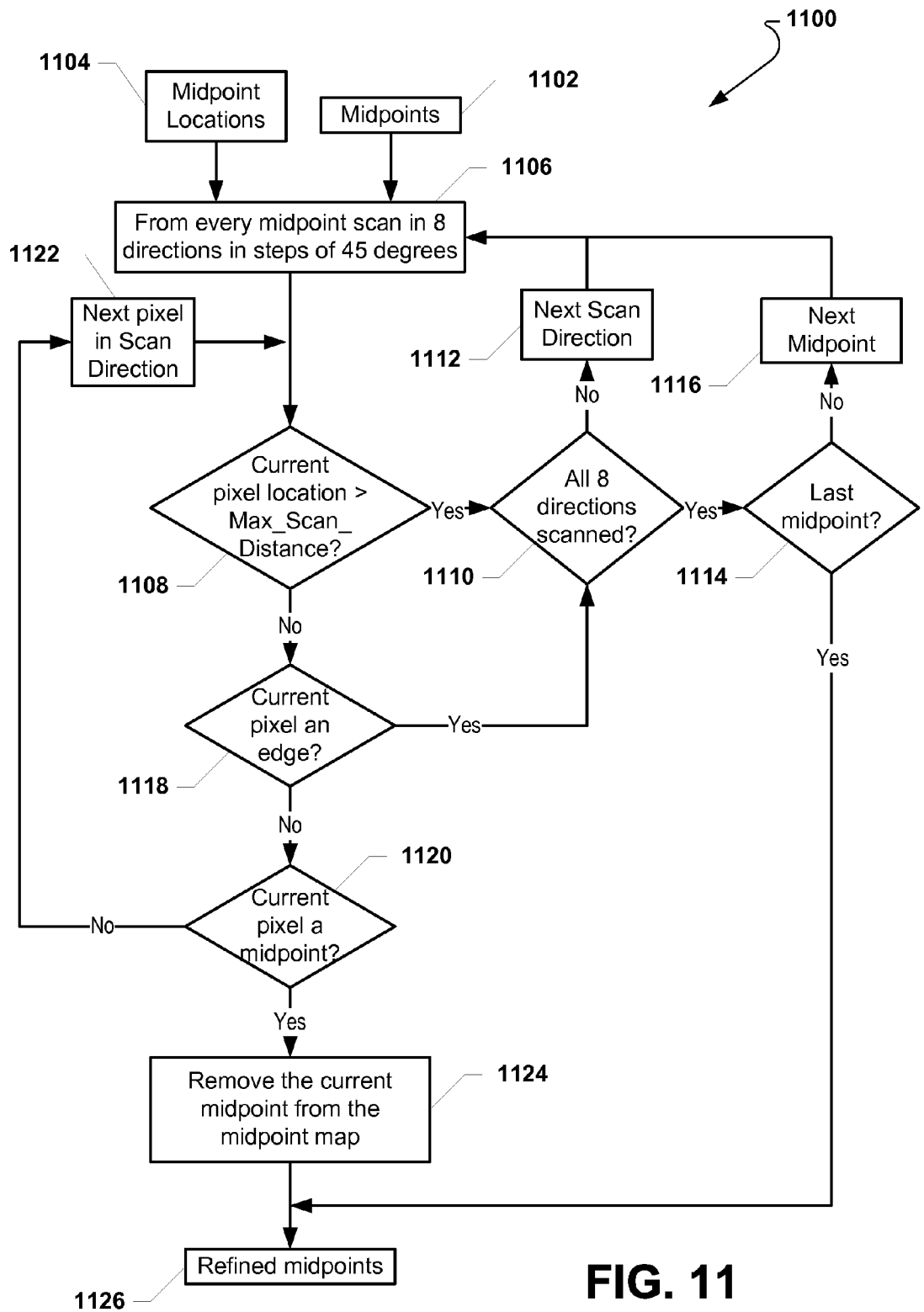
FIG. 11 is a flowchart illustrating a method of refining midpoints.
Figure 12:
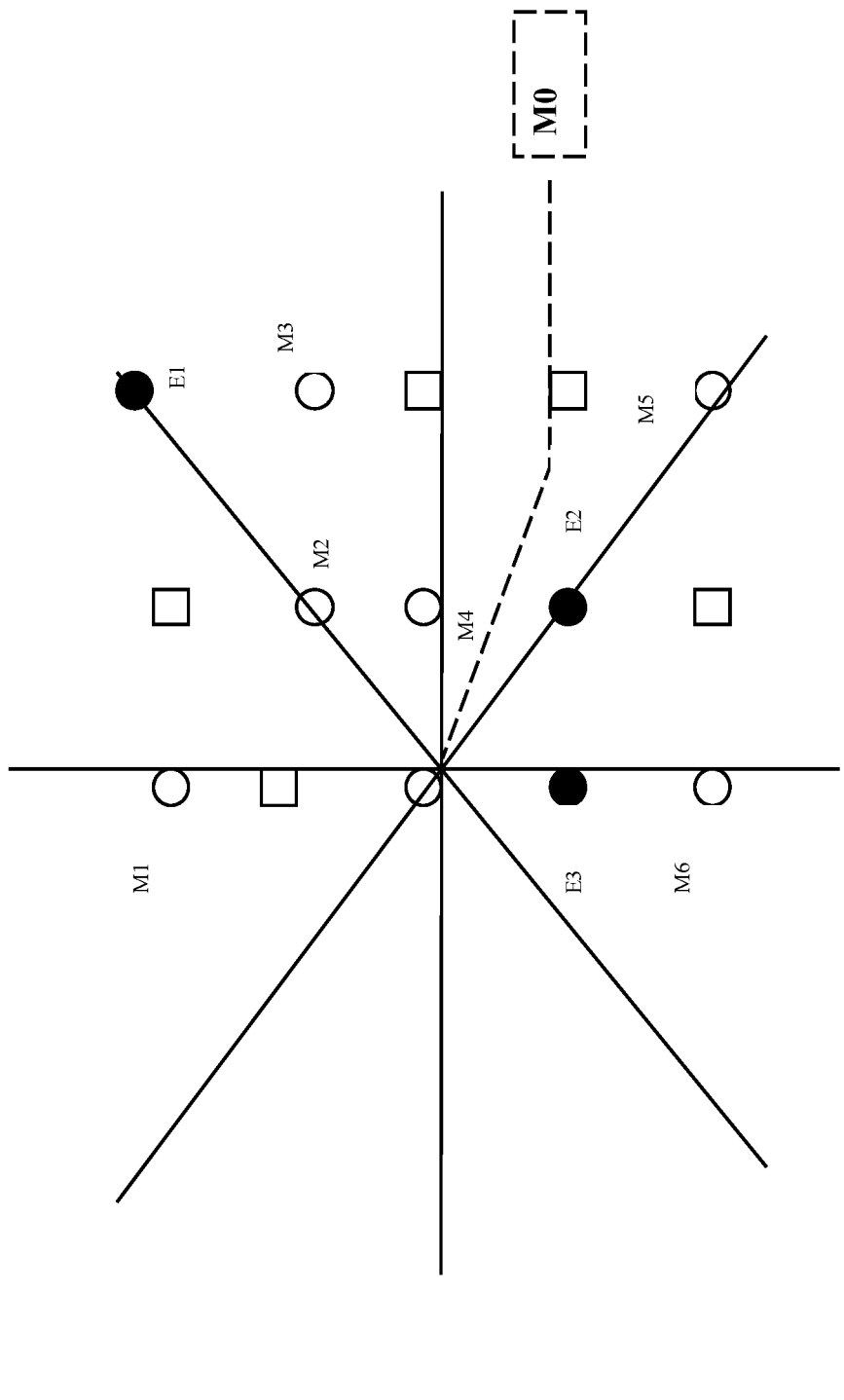
FIG. 12 is a diagram illustrating a plurality of pixels.

FIG. 11 illustrates a method of refining midpoints, generally designated 1100. The method 1100 may be performed using plurality of midpoints 1102 and a plurality of midpoint locations 1104. Commencing at block 1106, the encoder may scan from every midpoint in eight (8) directions in steps of forty-five degrees (45°), and for a maximum of Max_Scan_Distance positions for every scan direction, as shown in FIG. 12.

Moving to decision 1108, the encoder may determine if the current pixel location is greater than a Max_Scan_Distance. If so, the method 1100 may proceed to decision 1110 and the encoder may determine whether all eight (8) directions are scanned. If not, the method 1100 may proceed to block 1112 and the encoder may proceed to other next scan direction. The method 1100 may then return to block 1106 and continue as described herein.

Returning to decision 1110, if all eight (8) directions are scanned, the method 1100 may proceed to decision 1114 and the encoder may determine whether the last midpoint has been scanned. If not, the method 1100 may proceed to block 1116 and the encoder may move to the next midpoint. Thereafter, the method 1100 may return to block 1106 and continue as described herein. Otherwise, at decision 1114, if encoder has scanned around the last midpoint, the method 1100 may proceed to block 1118 and the encoder may output a plurality of refined midpoints. Then, the method 1100 may end.

Returning to decision 1108, if the current pixel location is not greater than a Max_Scan_Distance, the method may proceed to decision 1120 and the encoder may determine whether the current pixel is an edge. If so, the method 1100 may return to decision 1110 and continue as described herein. If the current midpoint is not an edge, the method 1100 may proceed to 1122 and the encoder may determine whether the current pixel is a midpoint. If not, the method 1100 may proceed to block 1124 and the encoder may move to the next pixel in the scan direction. At decision 1122, if the current pixel is a midpoint, the method 1100 may proceed to block 1126 and the current midpoint may be removed from a midpoint map. After all midpoints are processed as described in FIG. 11, a plurality of refined midpoints 1112 may be output and the method 1100 may end.

The method 1100 shown in FIG. 11 may be further explained with reference to FIG. 12, starting from a midpoint, scan-center, the neighboring pixels around the midpoint, in a block of five-by-five, may be scanned in steps of forty-five degrees (45°) along each of the eight lines (8) shown in FIG. 12. The neighboring midpoints may be eliminated until an edge pixel is encountered or the end of the block is reached. In the example shown in FIG. 12, pixel M0 may act as a scan center and midpoints M1, M2, and M4 may be eliminated as a result of the refinement. Pixels M5 and M6 may not be eliminated because they are across an edge and their values may differ quite significantly from the value of pixel M0.

In a particular aspect, the method 1100 shown in FIG. 11 may be used to reduce the amount of midpoints encoded in the initial iterations without significantly reducing the quality of reconstruction. The method 1100 may be considered part of a scalable encoding method in that further iterations may add further detail to an image frame which may result in better quality in the image frame. Further, the method 1100 may provide substantially better image quality than other methods for the same bitrate.

During the encoding of frame data, pixels at the centers between two edges in the horizontal direction or in the vertical direction are encoded as midpoints. Due to the nature of edges in an image, many uniform regions in an image may include a high density of midpoints. The additional midpoints, i.e., samples, may be unnecessary and may not lead to a significant improvement in image quality. The method 1100 shown in FIG. 11 may be used to eliminate unnecessary midpoints and prevent the encoding of such midpoints. Since the linear prediction may assume the presence of a midpoint between every two edges in the vertical and horizontal directions encoded in the previous iterations, the eliminated midpoints may need to be recovered from the neighboring midpoints. These midpoints may be considered landmark points and these landmark points may need to be recovered.

Figure 13:
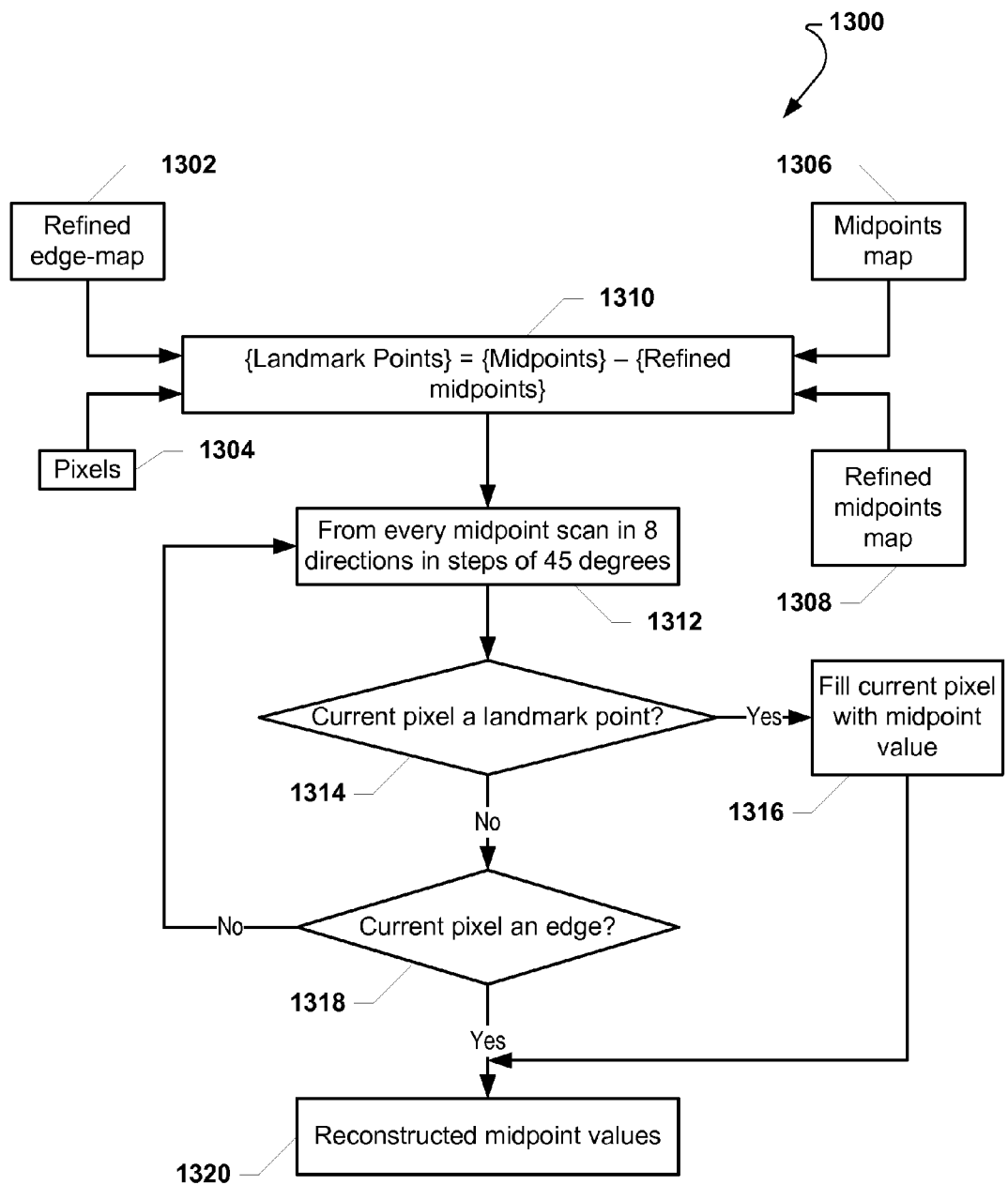
FIG. 13 is a flowchart illustrating a method of recovering midpoints.

FIG. 13 illustrates a method of recovering midpoints that is generally designated 1300. The method 1300 of FIG. 13 may be performed using a refined edge-map 1302, a plurality of pixels 1304, a midpoints-map 1306, a refined midpoints-map 1308, or a combination thereof.

Beginning at block 1310, the set of landmark points may be determined by those midpoints that are part of the set of Midpoints but not part of the set of Refined Midpoints, i.e., {Landmark Pts}={Midpoints}−{Refined Midpoints}. At block 1312, the encoder may scan from every midpoint in eight (8) directions in steps of forty-five degrees (45°). At decision 1314, the encoder may determine whether a current pixel is a landmark point. If so, the method 1300 may proceed to 1316 and the encoder may fill a current pixel with a midpoint value. The method 1300 may then end and a recovered midpoint map may be output.

Returning to decision 1314, if the current pixel is not a landmark point, the method 1300 may continue to decision 1318. At decision 1318, the encoder may determine whether the current pixel is an edge. If not, the method 1300 may return to block 1312 and continue as described herein. Otherwise, the method 1300 may end and a recovered midpoint map may be output.

Using the method 1300 described in FIG. 13, the locations of the landmark points, i.e., the eliminated midpoints, may be computed first. Then, the values at those locations may be filled with the value of the midpoint that is at the scan center, e.g., pixel M0 in FIG. 12. Since the decoder does not have these pixels, it may be useful to ensure that there is a midpoint between every two edges in both horizontal and vertical directions. Since the landmark pixels, or landmark points, may act as predictors, they should be identical at the encoder and the decoder. Hence, the recovery method 1300 shown in FIG. 13 may be performed at the encoder and the decoder.

The methods 1100, 1300 shown in FIG. 11 and FIG. 13 may be used to reduce the data rate by eliminating unnecessary midpoints without suffering a significant loss in image quality. These methods 1100, 1300 may reline on the edge information to preserve midpoints across object boundaries. Further, the methods 1100, 1300 are relatively simple and the elimination, at the encoder (method 1100), and the recovery at the decoder (1200) may follow the same scanning procedure.

Figure 14:
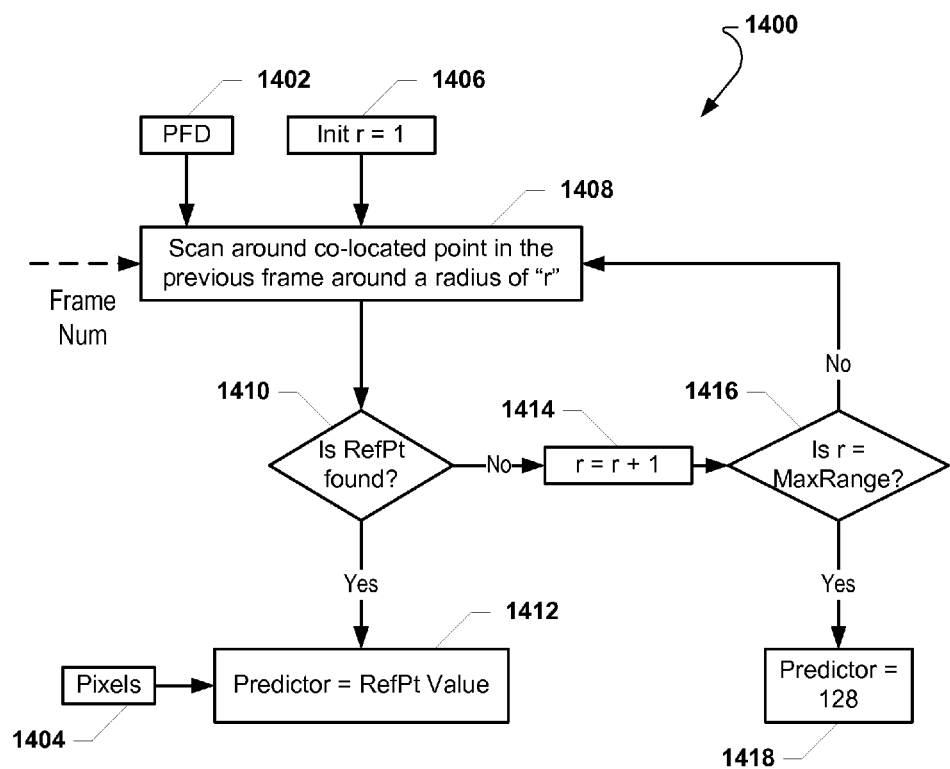
FIG. 14 is a flowchart illustrating a method of inter-edge/inter-midpoint prediction.
Figure 15:
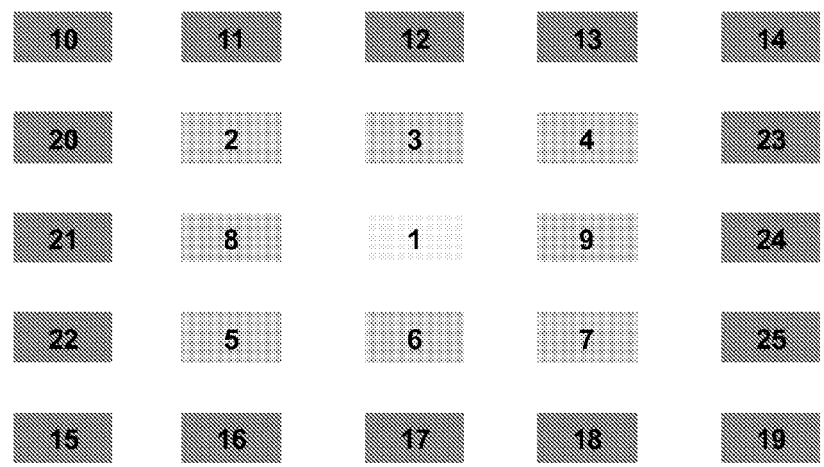
FIG. 15 is a diagram illustrating a plurality of pixels.

Referring to FIG. 14, a flowchart illustrating a method of inter-edge/inter-midpoint prediction is shown and is generally designated 1400. The method 1400 may be performed on multiple frames one frame number at a time. Further, the method 1400 may utilize previous frame data (PFD) 1402 and a plurality of pixels 1404, e.g., edge pixels, midpoint pixels, or a combination thereof. For clarity, FIG. 15 may be referred to during the description of the method 1400 shown in FIG. 14.

Commencing at block 1406, a search radius, r, may be initialized as having a value of one (1). At block 1408, the encoder may scan around a co-located point in the previous frame around a radius, r. More specifically, the scan may be performed in a square region around the central pixel, i.e., pixel 1 in FIG. 15. During the first iteration, the scan is performed from pixel 2 through pixel 8.

At decision 1410, the encoder may determine whether a reference point, RefPt, is found during the first scan iteration. If so, the method 1400 may continue to block 1412 and the inter-predicted value is set equal to the reference point value. Then, the method 1400 may end. At decision 1410, if a reference point is not found, the method 1400 may continue to block 1414 and the value of the search radius, r, may be increased by one (1) unit, e.g., one (1) pixel.

Thereafter, at decision 1416, the encoder may determine whether the search radius, r, is greater than a maximum value, MaxRange. If r is not greater than MaxRange, the method 1400 may return to block 1408 and continue as described herein. Otherwise, if r is greater than MaxRange, the method 1400 may move to block 1418 and the encoder may set the inter-predicted value equal to a predetermined default value. In a particular aspect, the predetermined default value is equal to a middle value in a range of values. For example, the predetermined default value may be one hundred twenty-eight (128) when the range of values of the data frame is between zero (0) and two hundred fifty-five (255). Then, the method 1400 may end.

The method 1400 described in conjunction with FIG. 14 may be used for both edges and midpoints. In the case the method is used to predict edge values, the RefPt may correspond to locations given by an edge-map. In the case the method 1400 is used to predict midpoint values, the RefPt may correspond to locations given by a midpoints-map.

Figure 16:
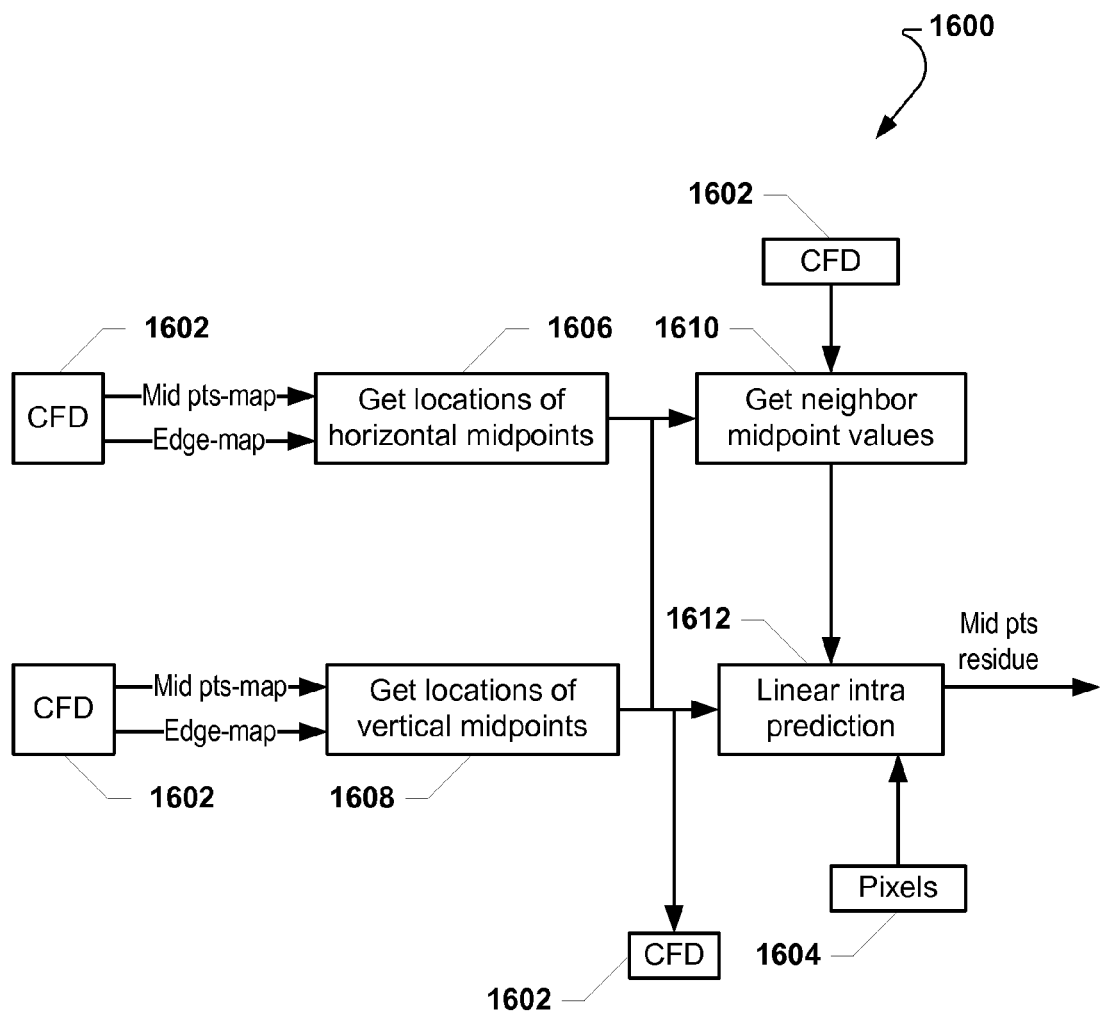
FIG. 16 is a flowchart illustrating a method of encoding horizontal and vertical midpoints.

FIG. 16 shows a method of encoding horizontal and vertical midpoints that is designated 1600. The method 1600 may be performed on current frame data (CFD) 1602 and pixels 1604. The CFD 1602 may include a midpoints-map and an edges-map. Beginning at block 1606, the locations of horizontal midpoints may be obtained. Further, at block 1608, the locations of the vertical midpoints may be obtained. At block 1610, neighbor midpoint values may be obtained. Further, at block 1612, linear intra-edge/intra-midpoint prediction may be performed. Thereafter, midpoints residue may be output and the method 1600 may end.

Figure 17:
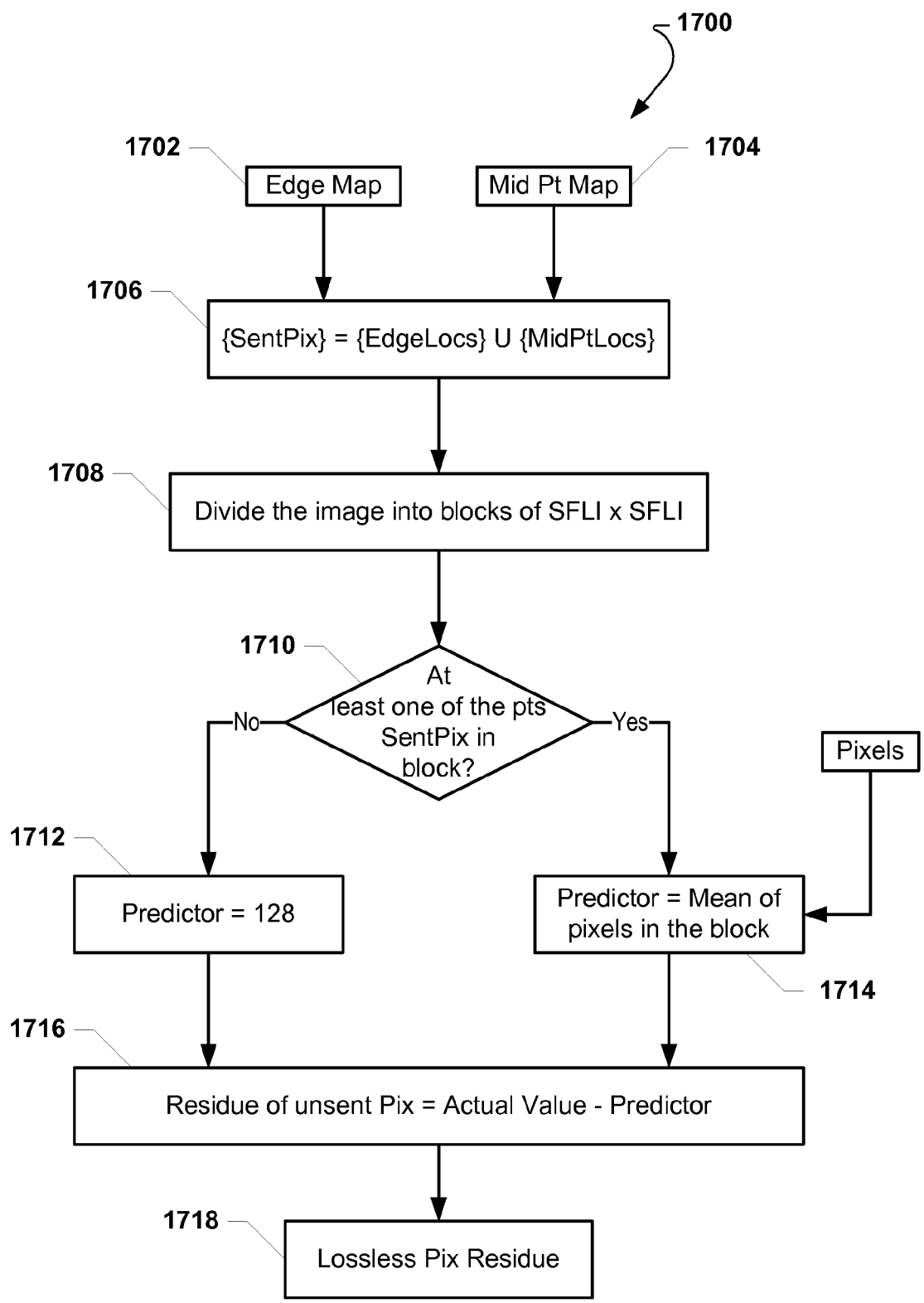
FIG. 17 is a flowchart illustrating a method of intra-edge/intra-midpoint prediction for unsent pixels.

Referring now to FIG. 17, a method of intra-edge/intra-midpoint prediction is shown and is generally designated 1700. The method 1700 shown in FIG. 17 may be performed on an edge-map 1702 and a midpoints-map 1704. Commencing at block 1706, the set of sent pixels, {SentPix}, may be determined by union of the edge pixels locations, {EdgeLocs}, and the midpoint pixels locations, {MidPtLocs}. In other words, {SentPix}={EdgeLocs}+{MidPtLocs}.

At block 1708, a frame image may be divided into blocks having dimensions based on the scale factor in the last iteration (SFLI). For example, if the SFLI is equal to two (2), the frame image may be divided into blocks two-by-two (2×2) pixels. Moving to decision 1710, the encoder may determine whether at least one of the pixels in the block of image pixels is one of the SentPix. If not, the method 1700 may proceed to block 1712 and a predictor value may be set equal to a predefined default value. In a particular aspect, the predetermined default value is equal to one hundred twenty-eight (128). Otherwise, if one of the pixels in the block of image pixels is one of the SentPix, the method 1700 may move to block 1714 and the predictor may be set equal to the mean value of the pixels in the block.

At block 1716, the residue of unset pixels is determined to be the actual value minus the predictor value determined at block 1712 or block 1714. Thereafter, lossless pixel residue 1718 may be output and the method 1700 may end.

In a particular aspect, an edge-based video codec may encode the edges and midpoints in a frame. The edge-based video codec may achieve scalable coding by coding more and more midpoints (samples) progressively, as the number of iterations increases. After the last iteration, a subset of the original frame's pixels may remain un-encoded. These un-encoded pixels may be encoded in a "lossless encoding pass" in order to achieve lossless quality. The method 1700 described in FIG. 17 provides a predictive coding technique based on the local average of the encoded edges and midpoints. The method 1700 may use a bit-map that indicates the location of the previously encoded pixels, e.g., edge pixels, midpoint pixels, or a combination thereof. The scale factor may be used to determine the minimum distance between every pair of edges in horizontal or vertical direction in order to determine a midpoint there between.

Figure 18:
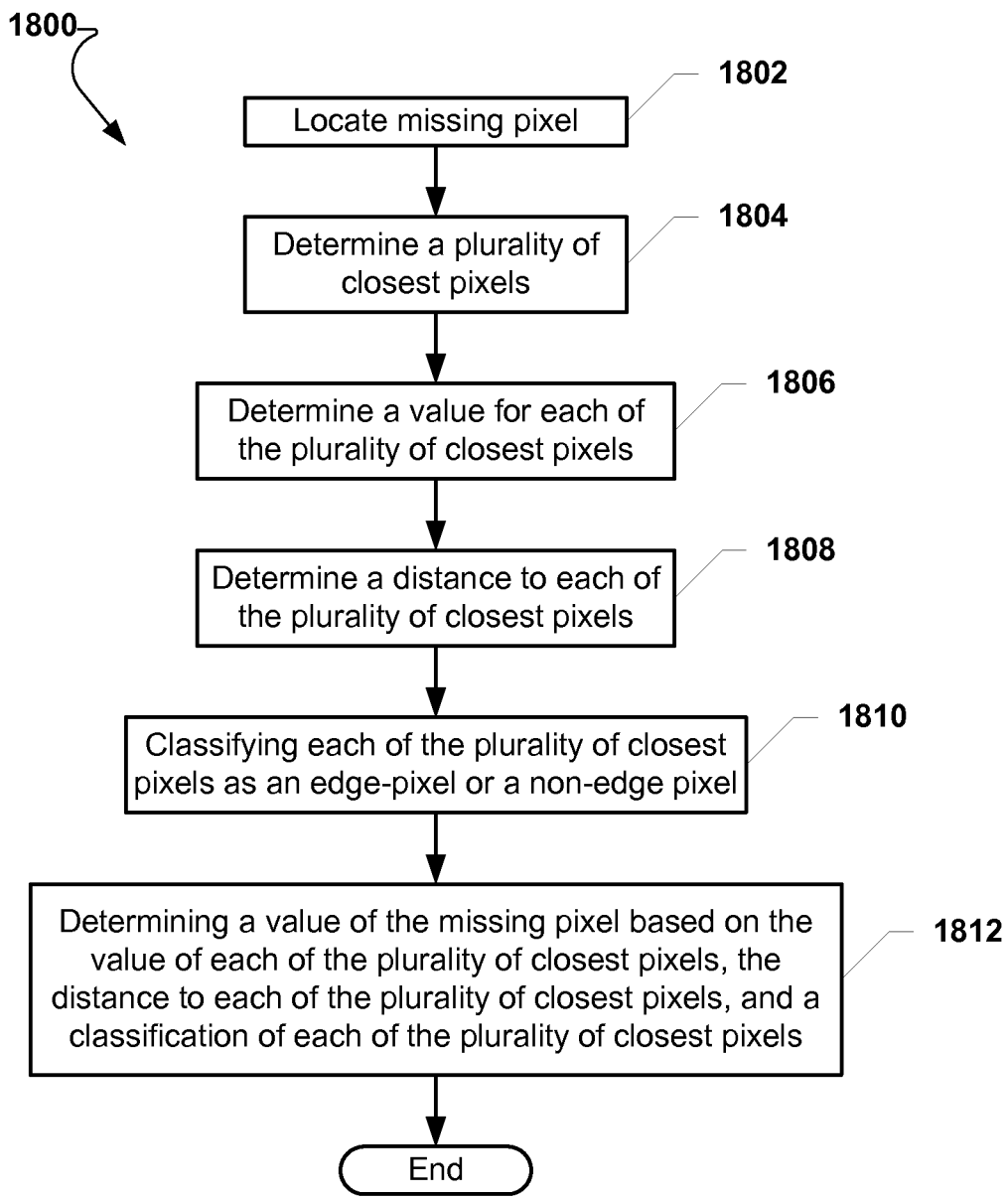
FIG. 18 is a flowchart illustrating a first aspect of a method of interpolating a pixel value.

FIG. 18 illustrates a first aspect of a method of interpolating a pixel value, generally designated 1800. Commencing at block 1802, a missing pixel may be located by a decoder. At block 1804, the decoder may determine a plurality of closest pixels. Further, at block 1806, the decoder may determine a value, e.g., a luminance value, for each of the plurality of closest pixels. At block 1808, the decoder may determine a distance to each of the plurality of closest pixels. At block 1810, the decoder may classify each of the plurality of closest pixels as an edge-pixel or a non-edge pixel. Thereafter, at block 1812, the decoder may determine a value of the missing pixel based on the value of each of the plurality of closest pixels, the distance to each of the plurality of closest pixels, and a classification of each of the plurality of closest pixels. The method 1800 may then end.

Figure 19:
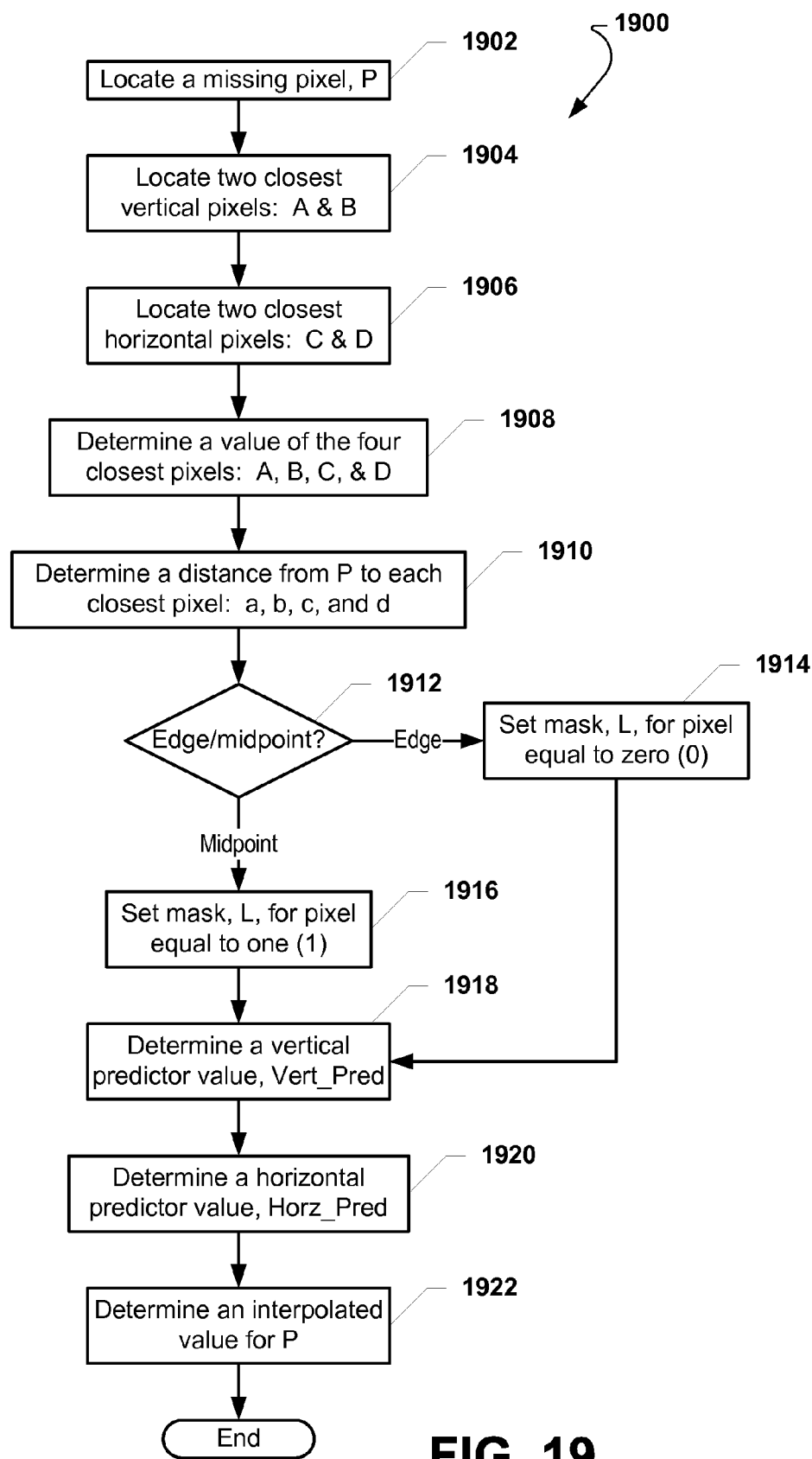
FIG. 19 is a flowchart illustrating a second aspect of a method of interpolating a pixel value.
Figure 20:
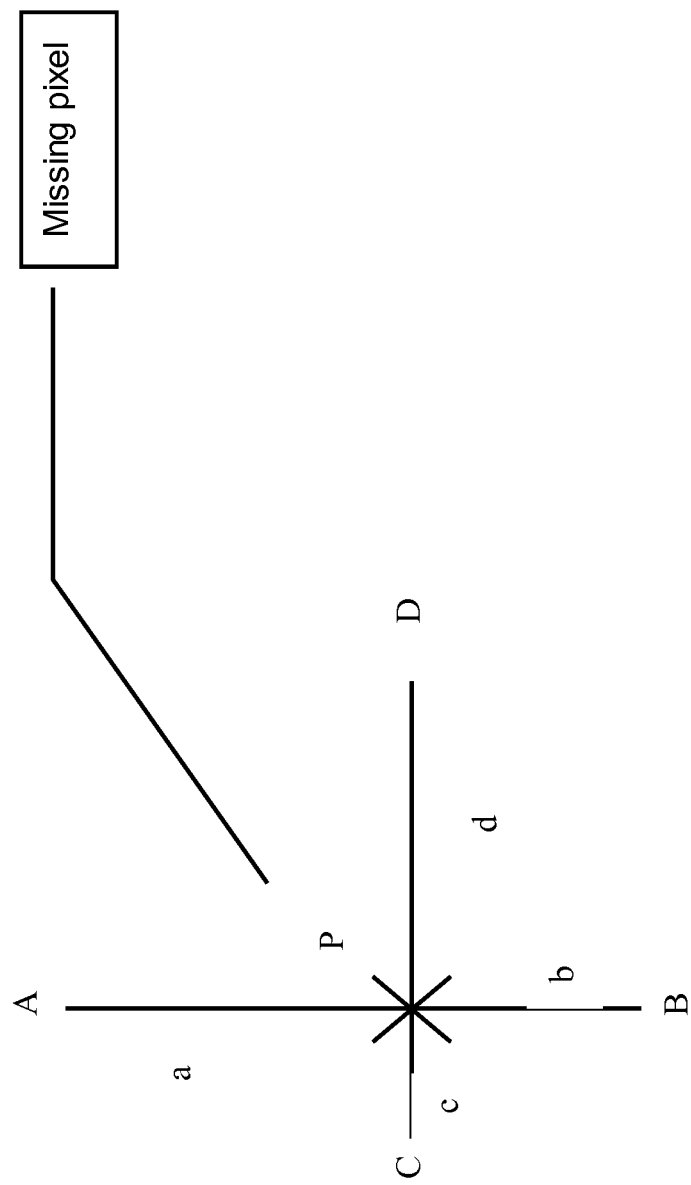
FIG. 20 is a representation of a plurality of pixels.

Referring to FIG. 19, a second aspect of a method of interpolating a pixel value is shown and is generally designated 1900. FIG. 20 is an illustration of pixels that may be referred to during the discussion of the method outlined in FIG. 19.

Beginning at block 1902, a missing pixel, P, may be located by a decoder. At block 1904, the decoder may locate the two closest vertical pixels: A and B. These two closest vertical pixels may include a first pixel along a vertical axis and a second pixel along a vertical axis. Further, at block 1906, the decoder may locate the two closest horizontal pixels: C and D. These two closest horizontal pixels may include a first pixel along a horizontal axis and a second pixel along a horizontal axis. At block 1908, the decoder may determine a value, e.g., a color density value, for each of the closest pixels. The values may be denoted A, B, C, and D. At block 1910, a distance from P to each closest pixel may be determined by the decoder. The distances may be denoted a, b, c, and d. As shown in FIG. 20, a is the distance to pixel A, b is the distance to pixel B, c is the distance to pixel C, and d is the distance to pixel D.

Moving to decision 1912, the decoder may determine whether a particular pixel, A, B, C, or D, is an edge or a midpoint. If a particular pixel is an edge, the method 1900 may proceed to block 1914 and the decoder may set a mask, L, for the particular pixel equal to zero (0). On the other hand, if a particular pixel is a midpoint, the method 1900 may continue to block 1916 and the decoder may set a mask, L, for the particular pixel equal to one (1). From block 1914 or block 1916, the method 1900 may continue to block 1918.

At block 1918, the decoder may determine a vertical predictor value, Vert_Pred. The vertical predictor value may be determined using the following formula:

$$\text{Vert\_Pred} = (L_A * A * b + L_B * B * a) / (L_B * a + L_A * b)$$

Where:
 $L_A$=the mask of pixel A,
 A=the value of pixel A,
 b=the distance to pixel B,
 $L_B$=the mask of pixel B,
 B=the value of pixel B, and
 a=the distance to pixel A.

Moving to block 1920, the decoder may determine a horizontal predictor value, Horz_Pred. The horizontal predictor value may be determined using the following formula:

$$\text{Horz\_Pred} = (L_C * C * d + L_D * D * c) / (L_D * c + L_C * d)$$

Where:
 $L_C$=the mask of pixel C,
 C=the value of pixel C,
 d=the distance to pixel D,
 $L_D$=the mask of pixel D,
 D=the value of pixel D, and
 d=the distance to pixel D.

At block 1922, the decoder may determine an interpolated value for P from the vertical predictor value and the horizontal predictor value. The interpolated value for P may be determined from the following formula:

$$\text{Interpolated Value}(P) = (\text{Vert\_Pred} + \text{Horz\_Pred})/2$$

Where:
 Vert_Pred=the vertical predictor determined at block 1918; and
 Horz_Pred=the horizontal predictor determined at block 1920.

In a particular aspect, the method 1900 described in conjunction with FIG. 19 may predict, or interpolate, a value of a missing pixel using the value of the four closest pixels (two horizontal and two vertical), the location of the four closest pixels (distance), and the classification of the closest available pixels (edge or midpoint). If a closest pixel is an edge, that pixel may not be used for interpolation. If a closest pixel is a midpoint, that pixel may be used for interpolating the value of the missing pixel applying a distance-weighted factor.

The method 1900 described in conjunction with FIG. 19 is relatively simple and accordingly, the method 1900 may be computationally inexpensive since it only uses linear operators. However, the method 1900 may be extended to a higher order equation for better performance at the expense of additional computational costs. Further, since only midpoints, and not edges, are used for interpolation, the method 1900 may ensure that samples across an edge which may be significantly different from the true value of the interpolated pixel value are not used as predictors. Moreover, the weighted prediction may help in varying the contribution of the various reference points. The weighted prediction may be very effective in regions having a smooth transition from top to bottom or from left to right.

It is to be understood that the methods described herein do not necessarily have to be performed in the order as described. Further, words such as "thereafter", "then", "next", etc. are not intended to limit the order of the steps. These words are simply used to guide the reader through the description of the methods.

With the configuration described herein, the system and method disclosed herein provides an interpolation algorithm that may be used to recover one or more missing pixels from available pixels using interpolation. Further, the system and method herein provides selective corner refinement. Regions that contain text may be identified and then, corners within the text may be detected and added to an edge map. Additionally, the system and methods disclosed herein provided an inter-frame prediction method and an intra-frame prediction method. The system and methods herein also provide a method for reducing the density of midpoints and recovering landmark points. Pixels at the centers between two edges in the horizontal or vertical direction may be encoded as midpoints. However, due to the nature of the edges in an image, many uniform regions in an image may include a high density of midpoints. Any additional midpoints may be reduced from a bitstream transmitted since they do not lead to a significant improvement in image quality.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method of interpolating a pixel value, the method comprising:
    locating a missing pixel;
    determining a plurality of closest pixels, wherein the plurality of closest pixels includes a first pixel along a vertical axis, a second pixel along the vertical axis, a third pixel along a horizontal axis, and a fourth pixel along the horizontal axis;
    determining a value for each of the plurality of closest pixels, wherein the first pixel along the vertical axis includes a first value, the second pixel along the vertical axis includes a second value, the third pixel along the horizontal axis includes a third value, and the fourth pixel along the horizontal axis includes a fourth value;
    determining a distance between the missing pixel and each of the plurality of closest pixels, wherein the distance between the missing pixel and each of the plurality of closest pixels includes a first distance along the vertical axis, a second distance along the vertical axis, a third distance along the horizontal axis, and a fourth distance along the horizontal axis;
    determining a classification for each of the plurality of closest pixels as either an edge pixel or a non-edge pixel, wherein the first pixel along the vertical axis includes a first classification, the second pixel along the vertical axis includes a second classification, the third pixel along the horizontal axis includes a third classification, and the fourth pixel along the horizontal axis includes a fourth classification;
    setting a plurality of masks, each mask corresponding to one of the plurality of closest pixels, wherein each mask is set equal to zero or one if the classification of the corresponding closest pixel is an edge pixel or a non-edge pixel, respectively, wherein setting the plurality of masks comprises:
        setting a first mask equal to zero or one if the first classification is an edge pixel or a non-edge pixel, respectively;
        setting a second mask equal to zero or one if the second classification is an edge pixel or a non-edge pixel, respectively;
        setting a third mask equal to zero or one if the third classification is an edge pixel or a non-edge pixel, respectively; and
        setting a fourth mask equal to zero or one if the fourth classification is an edge pixel or a non-edge pixel, respectively; and
    determining a value of the missing pixel at least partially based on the value of each of the plurality of closest pixels, the distance between the missing pixel and each of the plurality of closest pixels, and the mask corresponding to each of the plurality of closest pixels.

2. The method of claim 1, further comprising:
    determining a vertical predictor value, wherein the vertical predictor value is determined from Vert_Pred=$(L_A*A*b+L_B*B*a)/(L_B*a+L_A*b)$, wherein Vert_Pred is the vertical predictor value, $L_A$ is the first mask, A is the first value, b is the second distance, $L_B$ is the second mask, B is the second value, and a is the first distance.

3. The method of claim 2, further comprising:
    determining a horizontal predictor value, wherein the horizontal predictor value is determined from Horz_Pred=$(L_C*C*d+L_D*D*c)/(L_D*c+L_C*d)$, wherein Horz_Pred is the vertical predictor value, $L_C$ is the third mask, C is the third value, d is the fourth distance, $L_D$ is the fourth mask, D is the fourth value, and c is the third distance.

4. The method of claim 3, further comprising:
    determining an interpolated value for the missing pixel from P=(Vert_Pred+Horz_Pred)/2, wherein Vert_Pred is the vertical predictor value and Horz_Pred is the horizontal predictor value.

5. The method of claim 1, wherein the non-edge pixel is a midpoint pixel.

6. The method of claim 5, wherein the midpoint pixel may be obtained from a base layer bitstream, an enhancement layer bitstream, or a combination thereof.

7. The method of claim 1, where the value of each of the plurality of closest pixels is selected from the group consisting of: a luminance value, a color density value, a contrast value, or a gradient value.

8. A decoder device, the decoder device comprising:
    means for locating a missing pixel;
    means for determining a plurality of closest pixels, wherein the plurality of closest pixels includes a first pixel along a vertical axis, a second pixel along the vertical axis, a third pixel along a horizontal axis, and a fourth pixel along the horizontal axis;

means for determining a value for each of the plurality of closest pixels, wherein the first pixel along the vertical axis includes a first value, the second pixel along the vertical axis includes a second value, the third pixel along the horizontal axis includes a third value, and the fourth pixel along the horizontal axis includes a fourth value;

means for determining a distance between the missing pixel and each of the plurality of closest pixels, wherein the distance between the missing pixel and each of the plurality of closest pixels includes a first distance along the vertical axis, a second distance along the vertical axis, a third distance along the horizontal axis, and a fourth distance along the horizontal axis;

means for determining a classification for each of the plurality of closest pixels as either an edge pixel or a non-edge pixel, wherein the first pixel along the vertical axis includes a first classification, the second pixel along the vertical axis includes a second classification, the third pixel along the horizontal axis includes a third classification, and the fourth pixel along the horizontal axis includes a fourth classification;

means for setting a plurality of masks, each mask corresponding to one of the plurality of closest pixels, wherein each mask is set equal to zero or one if the classification of the corresponding closest pixel is an edge pixel or a non-edge pixel, respectively, wherein the means for setting the plurality of masks comprises:

means for setting a first mask equal to zero or one if the first classification is an edge pixel or a non-edge pixel, respectively;

means for setting a second mask equal to zero or one if the second classification is an edge pixel or a non-edge pixel, respectively;

means for setting a third mask equal to zero or one if the third classification is an edge pixel or a non-edge pixel, respectively; and means for setting a fourth mask equal to zero or one if the fourth classification is an edge pixel or a non-edge pixel, respectively; and means for determining a value of the missing pixel at least partially based on the value of each of the plurality of closest pixels, the distance between the missing pixel and each of the plurality of closest pixels, and the mask corresponding to each of the plurality of closest pixels.

9. The decoder device of claim 8, further comprising:

means for determining a vertical predictor value, wherein the vertical predictor value is determined from $Vert\_Pred = (L_A * A * b + L_B * B * a)/(L_B * a + L_A * b)$, wherein Vert_Pred is the vertical predictor value, $L_A$ is the first mask, A is the first value, b is the second distance, $L_B$ is the second mask, B is the second value, and a is the first distance.

10. The decoder device of claim 9, further comprising:

means for determining a horizontal predictor value, wherein the horizontal predictor value is determined from $Horz\_Pred = (L_C * C * d + L_D * D * c)/(L_D * c + L_C * d)$, wherein Horz_Pred is the vertical predictor value, $L_C$ is the third mask, C is the third value, d is the fourth distance, $L_D$ is the fourth mask, D is the fourth value, and c is the third distance.

11. The decoder device of claim 10, further comprising:

means for determining an interpolated value for the missing pixel from $P = (Vert\_Pred + Horz\_Pred)/2$, wherein Vert_Pred is the vertical predictor value and Horz_Pred is the horizontal predictor value.

12. The decoder device of claim 8, wherein the non-edge pixel is a midpoint pixel.

13. The decoder device of claim 12, wherein the midpoint pixel may be obtained from a base layer bitstream, an enhancement layer bitstream, or a combination thereof.

14. The decoder device of claim 8, where the value of each of the plurality of closest pixels is selected from the group consisting of: a luminance value, a color density value, a contrast value, or a gradient value.

15. A device, comprising:

a processor, wherein the processor is operable to:

locate a missing pixel;

determine a plurality of closest pixels, wherein the plurality of closest pixels includes a first pixel along a vertical axis, a second pixel along the vertical axis, a third pixel along a horizontal axis, and a fourth pixel along the horizontal axis;

determine a value for each of the plurality of closest pixels, wherein the first pixel along the vertical axis includes a first value, the second pixel along the vertical axis includes a second value, the third pixel along the horizontal axis includes a third value, and the fourth pixel along the horizontal axis includes a fourth value;

determine a distance between the missing pixel and each of the plurality of closest pixels, wherein the distance between the missing pixel and each of the plurality of closest pixels includes a first distance along the vertical axis, a second distance along the vertical axis, a third distance along the horizontal axis, and a fourth distance along the horizontal axis;

determine a classification for each of the plurality of closest pixels as either an edge pixel or a non-edge pixel, wherein the first pixel along the vertical axis includes a first classification, the second pixel along the vertical axis includes a second classification, the third pixel along the horizontal axis includes a third classification, and the fourth pixel along the horizontal axis includes a fourth classification;

set a plurality of masks, each mask corresponding to one of the plurality of closest pixels, wherein each mask is set equal to zero or one if the classification of the corresponding closest pixel is an edge pixel or a non-edge pixel, respectively, wherein the processor is further operable to:

set a first mask equal to zero or one if the first classification is an edge pixel or a non-edge pixel, respectively;

set a second mask equal to zero or one if the second classification is an edge pixel or a non-edge pixel, respectively;

set a third mask equal to zero or one if the third classification is an edge pixel or a non-edge pixel, respectively; and set a fourth mask equal to zero or one if the fourth classification is an edge pixel or a non-edge pixel, respectively; and determine a value of the missing pixel at least partially based on the value of each of the plurality of closest pixels, the distance between the missing pixel and each of the plurality of closest pixels, and the mask corresponding to each of the plurality of closest pixels.

16. The device of claim 15, wherein the processor is further operable to:
   determine a vertical predictor value, wherein the vertical predictor value is determined from Vert_Pred= $(L_A*A*b+L_B*B*a)/(L_B*a+L_A*b)$, wherein Vert_Pred is the vertical predictor value, $L_A$ is the first mask, A is the first value, b is the second distance, $L_B$ is the second mask, B is the second value, and a is the first distance.

17. The device of claim 16, wherein the processor is further operable to:
   determine a horizontal predictor value, wherein the horizontal predictor value is determined from Horz_Pred= $(L_C*C*d+L_D*D*c)/(L_D*c+L_C*d)$, wherein Horz_Pred is the vertical predictor value, $L_C$ is the third mask, C is the third value, d is the fourth distance, $L_D$ is the fourth mask, D is the fourth value, and c is the third distance.

18. The device of claim 17, wherein the processor is further operable to:
   determine an interpolated value for the missing pixel from P=(Vert_Pred+Horz_Pred)/2, wherein Vert_Pred is the vertical predictor value and Horz_Pred is the horizontal predictor value.

19. The device of claim 15, wherein the non-edge pixel is a midpoint pixel.

20. The device of claim 19, wherein the midpoint pixel may be obtained from a base layer bitstream, an enhancement layer bitstream, or a combination thereof.

21. The device of claim 15, where the value of each of the plurality of closest pixels is selected from the group consisting of: a luminance value, a color density value, a contrast value, or a gradient value.

22. A computer program product, comprising:
   a non-transitory computer-readable medium, comprising:
      at least one instruction for locating a missing pixel;
      at least one instruction for determining a plurality of closest pixels, wherein the plurality of closest pixels includes a first pixel along a vertical axis, a second pixel along the vertical axis, a third pixel along a horizontal axis, and a fourth pixel along the horizontal axis;
      at least one instruction for determining a value for each of the plurality of closest pixels, wherein the first pixel along the vertical axis includes a first value, the second pixel along the vertical axis includes a second value, the third pixel along the horizontal axis includes a third value, and the fourth pixel along the horizontal axis includes a fourth value;
      at least one instruction for determining a distance between the missing pixel and each of the plurality of closest pixels, wherein the distance between the missing pixel and each of the plurality of closest pixels includes a first distance along the vertical axis, a second distance along the vertical axis, a third distance along the horizontal axis, and a fourth distance along the horizontal axis;
      at least one instruction for determining a classification for each of the plurality of closest pixels as either an edge pixel or a non-edge pixel, wherein the first pixel along the vertical axis includes a first classification, the second pixel along the vertical axis includes a second classification, the third pixel along the horizontal axis includes a third classification, and the fourth pixel along the horizontal axis includes a fourth classification;
      at least one instruction for setting a plurality of masks, each mask corresponding to one of the plurality of closest pixels, wherein each mask is set equal to zero or one if the classification of the corresponding closest pixel is an edge pixel or a non-edge pixel, respectively, wherein the computer-readable medium further comprises:
         at least one instruction for setting a first mask equal to zero or one if the first classification is an edge pixel or a non-edge pixel, respectively;
         at least one instruction for setting a second mask equal to zero or one if the second classification is an edge pixel or a non-edge pixel, respectively;
         at least one instruction for setting a third mask equal to zero or one if the third classification is an edge pixel or a non-edge pixel, respectively; and
         at least one instruction for setting a fourth mask equal to zero or one if the fourth classification is an edge pixel or a non-edge pixel, respectively; and
      at least one instruction for determining a value of the missing pixel at least partially based on the value of each of the plurality of closest pixels, the distance between the missing pixel and each of the plurality of closest pixels, and the mask corresponding to each of the plurality of closest pixels.

23. The computer program product of claim 22, wherein the computer-readable medium further comprises:
   at least one instruction for determining a vertical predictor value, wherein the vertical predictor value is determined from Vert_Pred=$(L_A*A*b+L_B*B*a)/(L_B*a+L_A*b)$, wherein Vert_Pred is the vertical predictor value, $L_A$ is the first mask, A is the first value, b is the second distance, $L_B$ is the second mask, B is the second value, and a is the first distance.

24. The computer program product of claim 23, wherein the computer-readable medium further comprises:
   at least one instruction for determining a horizontal predictor value, wherein the horizontal predictor value is determined from Horz_Pred=$(L_C*C*d+L_D*D*c)/(L_D*c+L_C*d)$, wherein Horz_Pred is the vertical predictor value, $L_C$ is the third mask, C is the third value, d is the fourth distance, $L_D$ is the fourth mask, D is the fourth value, and c is the third distance.

25. The computer program product of claim 24, wherein the computer-readable medium further comprises:
   at least one instruction for determining an interpolated value for the missing pixel from P=(Vert_Pred+Horz_Pred)/2, wherein Vert_Pred is the vertical predictor value and Horz_Pred is the horizontal predictor value.

26. The computer program product of claim 22, wherein the non-edge pixel is a midpoint pixel.

27. The computer program product of claim 26, wherein the midpoint pixel may be obtained from a base layer bitstream, an enhancement layer bitstream, or a combination thereof.

28. The computer program product of claim 22, where the value of each of the plurality of closest pixels is selected from the group consisting of: a luminance value, a color density value, a contrast value, or a gradient value.

* * * * *